(12) United States Patent
Fukawatase et al.

(10) Patent No.: US 10,618,437 B2
(45) Date of Patent: Apr. 14, 2020

(54) VEHICLE SEAT

(71) Applicant: TOYOTA JIDOSHA KABUSHIKI KAISHA, Toyota-shi, Aichi-ken (JP)

(72) Inventors: Osamu Fukawatase, Miyoshi (JP); Mitsuyoshi Ohno, Miyoshi (JP); Shun Ito, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/217,462

(22) Filed: Dec. 12, 2018

(65) Prior Publication Data

US 2019/0217754 A1 Jul. 18, 2019

(30) Foreign Application Priority Data

Jan. 18, 2018 (JP) ................................. 2018-006568

(51) Int. Cl.
*B60N 2/42* (2006.01)
*B60N 2/427* (2006.01)
(Continued)

(52) U.S. Cl.
CPC ........ *B60N 2/42745* (2013.01); *B60N 2/3011* (2013.01); *B60N 2/4214* (2013.01);
(Continued)

(58) Field of Classification Search
CPC .............. B60N 2/42745; B60N 2/3011; B60N 2/4214; B60N 2/4221; B60N 2/42754; B60N 2/4279; B60N 2/433; B60N 2021/01265; B60N 2021/23528; B60R 21/013; B60R 21/16; B60R 22/00; B60R 22/26
(Continued)

(56) References Cited

U.S. PATENT DOCUMENTS 5,203,600 A  4/1993 Watanabe et al.
5,362,132 A * 11/1994 Griswold ............... B60N 2/688
                                                          297/284.1
(Continued)

FOREIGN PATENT DOCUMENTS

DE   41 21 548 A1   1/1992
JP   H07-047840 A   2/1995
(Continued)

*Primary Examiner* — Mark R Wendell
(74) *Attorney, Agent, or Firm* — Oliff PLC

(57) ABSTRACT

A vehicle seat installed with a vehicle occupant restraining device, the vehicle seat includes: a seat cushion frame including a seat cushion side frame; a seatback frame supported swingably about a reclining rod and including a seatback side frame; an engaging portion disposed at a seat rear end side of the seat cushion side frame and at a seat lower side relative to the reclining rod, and protruding toward a seat transverse direction inner side; a first movable member disposed along the seatback side frame, a lower end portion of the first movable member being extended to position at a seat front side of the engaging portion; and a first driving member configured to extend the first movable member in a case in which a vehicle collision at a seat front side occurs or a vehicle collision at the seat front side is predicted.

13 Claims, 21 Drawing Sheets

(51) Int. Cl.
  *B60R 21/013* (2006.01)
  *B60N 2/30* (2006.01)
  *B60N 2/433* (2006.01)
  *B60R 22/26* (2006.01)
  *B60R 21/16* (2006.01)
  *B60R 22/00* (2006.01)
  *B60R 21/01* (2006.01)
  *B60R 21/235* (2006.01)

(52) U.S. Cl.
  CPC ......... *B60N 2/4221* (2013.01); *B60N 2/4279* (2013.01); *B60N 2/42754* (2013.01); *B60N 2/433* (2013.01); *B60R 21/013* (2013.01); *B60R 21/16* (2013.01); *B60R 22/00* (2013.01); *B60R 22/26* (2013.01); *B60R 2021/01265* (2013.01); *B60R 2021/23528* (2013.01)

(58) Field of Classification Search
  USPC .......................... 297/216.15, 216.13, 216.1
  See application file for complete search history.

(56) References Cited

U.S. PATENT DOCUMENTS

| | | | | |
|---|---|---|---|---|
| 5,746,467 | A * | 5/1998 | Jesadanont | B60N 2/4221 296/68.1 |
| 6,022,074 | A * | 2/2000 | Swedenklef | B60N 2/2222 297/216.14 |
| 6,312,049 | B1 * | 11/2001 | Sullivan | B60N 2/0232 297/216.1 |
| 7,216,931 | B2 * | 5/2007 | Friedman | B60N 2/42745 297/216.1 |
| 7,918,302 | B2 * | 4/2011 | Sakai | B60N 2/0244 180/274 |
| 10,086,792 | B1 * | 10/2018 | Watanabe | B60R 22/18 |
| 2005/0134100 | A1 * | 6/2005 | Canteleux | B60N 2/1615 297/344.15 |
| 2005/0211491 | A1 * | 9/2005 | Friedman | B60N 2/0276 180/282 |
| 2006/0202531 | A1 * | 9/2006 | Fourrey | B60N 2/206 297/335 |
| 2009/0267386 | A1 | 10/2009 | Persson | |
| 2010/0176628 | A1 * | 7/2010 | Pywell | B60N 2/42736 297/216.1 |
| 2012/0153658 | A1 * | 6/2012 | Kanda | B60N 2/1615 296/65.13 |
| 2013/0187430 | A1 * | 7/2013 | Watanabe | B60N 2/68 297/452.19 |
| 2017/0008480 | A1 * | 1/2017 | Ohno | B60R 16/02 |
| 2017/0021748 | A1 * | 1/2017 | Gale | B60N 2/42709 |
| 2018/0236962 | A1 | 8/2018 | Ohno et al. | |

FOREIGN PATENT DOCUMENTS

| | | |
|---|---|---|
| JP | 2009-539698 A | 11/2009 |
| JP | 2010-132079 A | 6/2010 |
| JP | 2011-005978 A | 1/2011 |
| WO | 2016/174785 A1 | 11/2016 |

* cited by examiner

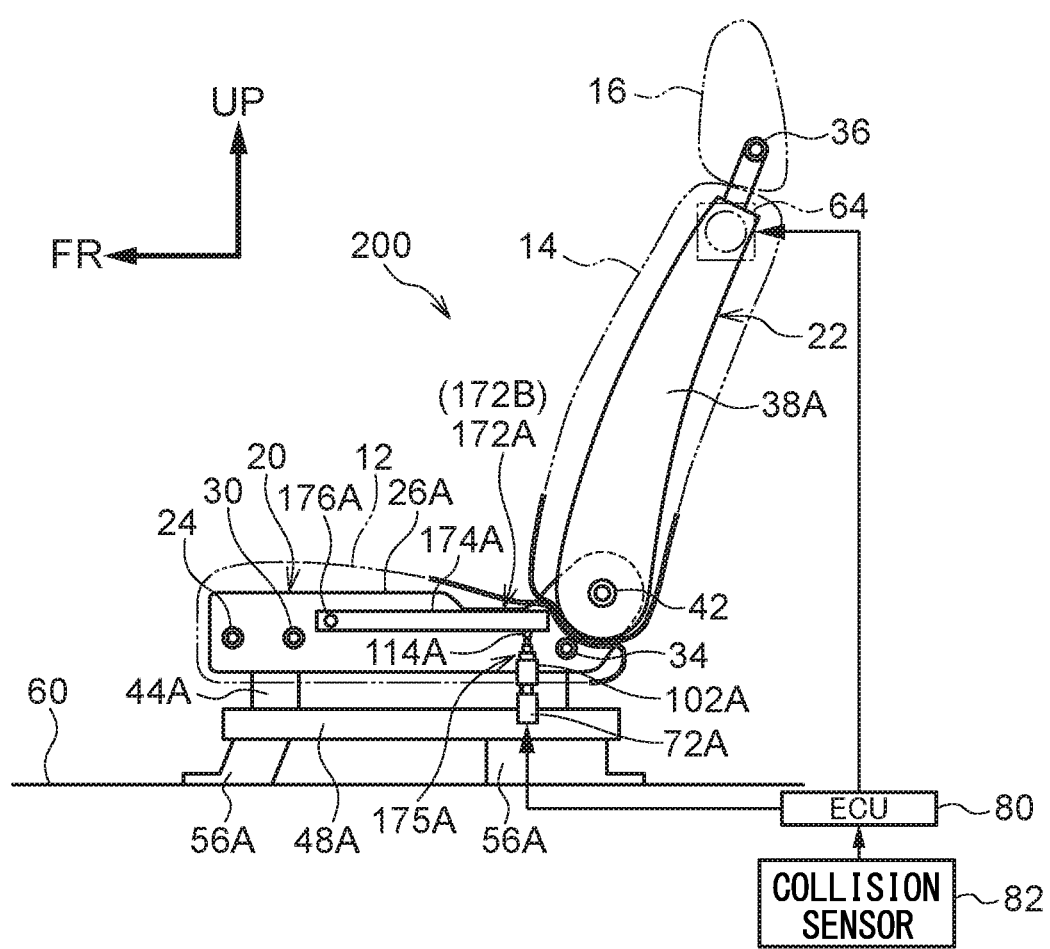

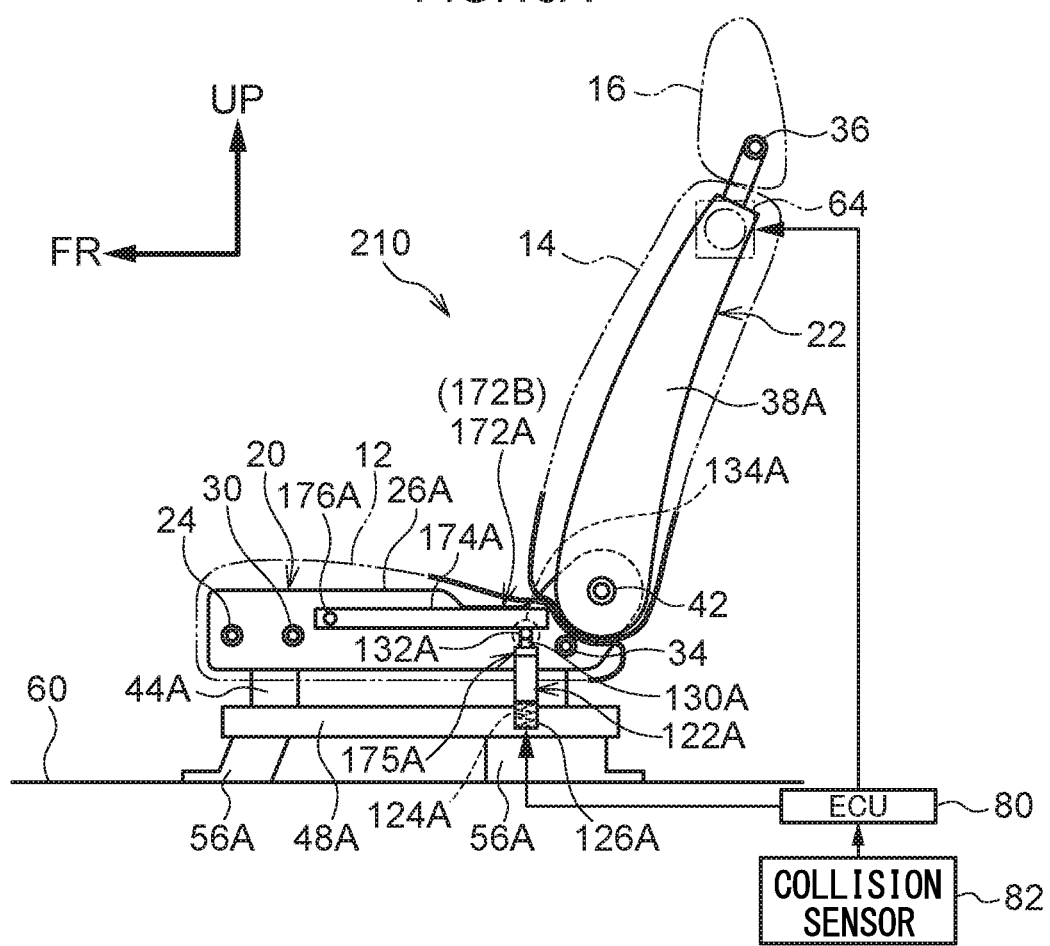

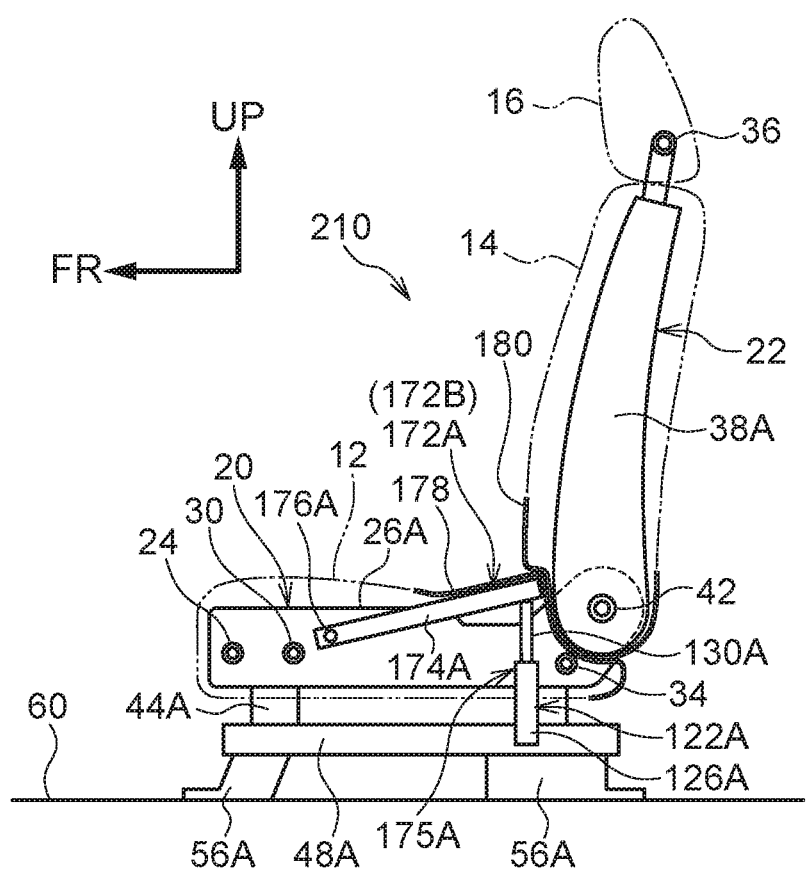

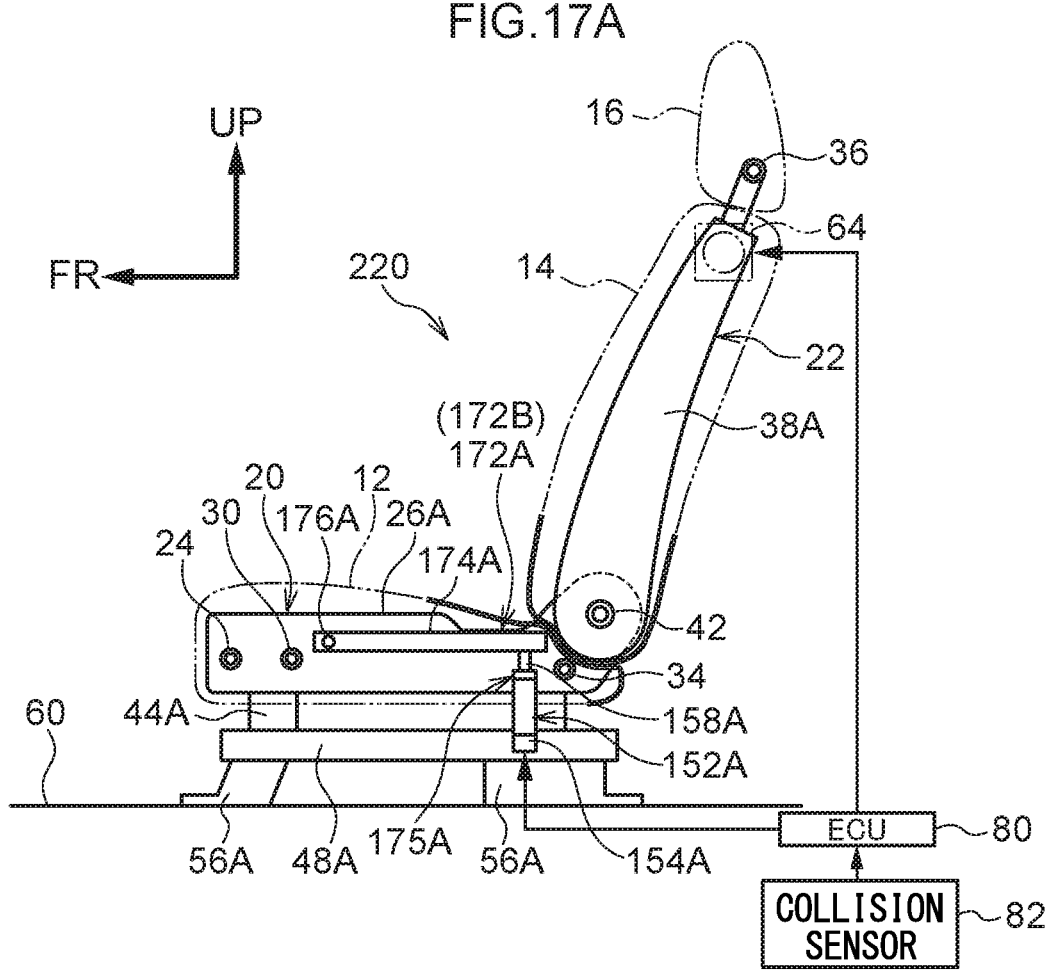

VEHICLE SEAT

CROSS-REFERENCE TO RELATED APPLICATION

This application claims priority under 35 USC 119 from Japanese Patent Application No. 2018-6568 filed Jan. 18, 2018, the disclosure of which is incorporated by reference herein in its entirety.

BACKGROUND

Technical Field

The present disclosure relates to a vehicle seat.

Related Art

Developments in self-driving vehicles have advanced in recent years. In a self-driving vehicle, because there is no need for the driver to sit in a vehicle seat while facing forward at times of automatic driving, enabling conversation with the passengers seated in the rear seat or the like by moving the vehicle seat greatly or rotating the seat so as to face rearward, and the like, are being devised.

In such a case, restraining devices such as seatbelts and the like are provided at the vehicle seats in order for the vehicle seat to move greatly as compared with in a conventional vehicle, or to rotate as seen in a plan view, or the like.

For example, structures in which a retractor or the like is incorporated within a seatback, and the seatbelt is pulled-into the interior of the seatback from the shoulder portion of the seatback, and the providing of airbags for front collisions and airbags for side collisions, have been proposed (refer to PCT International Publication No. 2016/174785).

SUMMARY

However, since a restraining device is installed in a vehicle seat, a large impact load is inputted to the vehicle seat via the restraining device from a vehicle occupant who moves inertially at the time of a collision.

For example, if the seat front side of the vehicle is involved in a collision, there is the concern that impact load toward the seat front side will be applied to the seatback via the seatbelt from the vehicle occupant who moves inertially, and that the seatback, which is supported at a seat cushion via a reclining unit, will tilt forward (hereinafter called "forward tilting").

Due to a restraining device being installed in a vehicle seat in this way, strength that has conventionally been borne by a vehicle body member, such as a B-pillar or the instrument panel or the like, is required for the vehicle seat.

If the seat frame or the like is reinforced in order to ensure such strength at the vehicle seat, there is the problem that the increase in the mass of the vehicle seat is large.

In view of the above-described circumstances, an object of the present disclosure is to provide a vehicle seat that can suppress forward tilting of a seatback at the time of a seat front side collision of the vehicle, while suppressing an increase in mass.

A vehicle seat of a first aspect of the present disclosure is a vehicle seat in which a vehicle occupant restraining device is installed, the vehicle seat including: a seat cushion frame that forms a frame of a seat cushion, and that includes a seat cushion side frame that extends in a seat front-rear direction at a seat transverse direction end portion; a seatback frame that is supported swingably about a reclining rod, the reclining rod extends in a seat transverse direction at a seat rear end side of the seat cushion frame, the seatback frame extends toward a seat upper side from a seat rear end side of the seat cushion frame, and the seatback frame includes a seatback side frame that extends in a seat vertical direction at a seat transverse direction end portion; an engaging portion that is disposed at a seat rear end side of the seat cushion side frame and at a seat lower side relative to the reclining rod, the engaging portion protrudes toward a seat transverse direction inner side; a first movable member that is disposed along the seatback side frame, and a lower end portion of the first movable member is positioned at a seat front side of the engaging portion due to the first movable member extending toward a seat lower side; and a first driving member that is configured to extend the first movable member in a case in which a vehicle collision at a seat front side occurs or in a case in which a vehicle collision at the seat front side is predicted.

In accordance with the vehicle seat of this structure, the restraining device, e.g., a seatbelt, is provided at the vehicle seat. Therefore, when the seatbelt restrains the vehicle occupant due to operation of a pretensioner or the like at the time of a collision of the vehicle from the seat front side, load toward the seat front side is inputted to the seatback via the seatbelt from the vehicle occupant who inertially moves toward the seat front side.

The first movable member, which is disposed along the seatback side frame and is extendable toward the seat lower side, is provided at the vehicle seat. At a time of a seat front side collision of the vehicle, or at a time at which a seat front side collision is predicted, the first driving member is configured to extend the first movable member. Due thereto, the seat lower side end portion of the first movable member that has been extended is positioned at the seat front side of the engaging portion that protrudes toward the seat transverse direction inner side at the seat rear side of the seat cushion side frame.

Here, at the time of a seat front side collision, the seatback tilts forward due to the input of load toward the seat front side. However, the seat lower side end portion of the first movable member that has been extended abuts (is anchored on) the engaging portion at further toward the seat lower side than the reclining rod, and forward tilting of the seatback is prevented or suppressed.

Note that, at usual times, the first movable member is disposed along the seatback frame, and is not positioned at the seat front side of the engaging portion that is provided at the seat cushion side frame. Therefore, swinging motion (the reclining operation) of the seatback is not impeded.

In a vehicle seat of a second aspect of the present disclosure, in the first aspect, the seat cushion side frame is provided at both seat transverse direction end portions of the seat cushion frame, and the engaging portion is formed at both of the seat transverse direction end portions of the seat cushion frame so as to protrude toward seat transverse direction inner sides of the seat cushion side frames, respectively, and the first movable member is provided at both seat transverse direction end portions of the seatback frame, and lower end portions of the first movable members are positioned at seat front sides of the respective engaging portions due to extension of the first movable members.

In the vehicle seat of this structure, the engaging portion is provided at both seat transverse direction end portions of the seat cushion frame so as to protrude from the seat cushion side frames toward the vehicle transverse direction inner sides. A pair of the first movable members are provided along the respective seatback frames in correspondence with the respective engaging portions. Accordingly, at the time of a seat front side collision of the vehicle or at the time at which a seat front side collision is predicted, the lower end portions of the pair of first movable members that have been extended abut (are anchored on) the pair of engaging portions, and, due thereto, forward tilting of the seatback is prevented or suppressed more stably.

In a vehicle seat of a third aspect of the present disclosure, in the second aspect, each of the engaging portion is a cross member that spans, in the seat transverse direction, between seat rear sides of the seat cushion side frames.

Each of the engaging portion is a cross member that structures the seat cushion frame. Therefore, there is no need to newly provide engaging portions in order to abut the first movable members that have been extended. Namely, an increase in the mass of the vehicle seat or in the number of parts in order to suppress forward tilting of the seatback can be suppressed. Note that the cross member is a member other than the reclining rod.

In a vehicle seat of a fourth aspect of the present disclosure, in the second aspect, the engaging portions are convex portions that are formed so as to protrude toward seat transverse direction inner sides at seat rear sides of the seat cushion side frames.

The engaging portions are convex portions that are formed so as to protrude toward the seat transverse direction inner sides from the seat cushion side frames. In other words, as compared with the cross member that extends in the seat transverse direction, convex portions, which have the minimum volume for abutting the seat lower side end portions of the first movable members which have been extended, suffice. Therefore, an increase in the mass of the vehicle seat due to the provision of the engaging portions can be suppressed.

In a vehicle seat of a fifth aspect of the present disclosure, in the first aspect, the first driving member is an inflator that is operated in a case in which a vehicle collision at a seat front side occurs or in a case in which a vehicle collision at the seat front side is predicted, and the first movable member is a metal container that is extendable on receipt of an operating gas supplied from the inflator.

In the vehicle seat of this structure, the first driving member is an inflator, and the first movable member is a metal container that is extendable on receipt of an operating gas supplied from the inflator.

Accordingly, due the inflator being driven at the time of a seat front side collision of the vehicle or at the time at which a seat front side collision is predicted, operating gas from the inflator is supplied to the metal container, and the metal container, which is disposed along the seatback side frame, extends toward the seat lower side. As a result, the seat lower side end portion of the extended metal container is positioned at the seat front side of the engaging portion that is provided so as to protrude toward the seat transverse direction inner side at the seat rear side of the seat cushion side frame.

Here, at the time of a seat front side collision of the vehicle, the seatback tilts forward. However, the seat lower side end portion of the metal container that has been extended abuts (is anchored on), from the seat front side, the engaging portion that is positioned further toward the seat lower side than the reclining rod, and forward tilting of the seatback is prevented or suppressed.

Further, in this vehicle seat, because the first movable member is made to be the metal container that extends due the operating gas of the inflator, an increase in the mass of the vehicle seat can be suppressed more.

In a vehicle seat of a sixth aspect of the present disclosure, in the first aspect, the first driving member is an inflator that is operated in a case in which a vehicle collision at a seat front side occurs or in a case in which a vehicle collision at the seat front side is predicted, and the first movable member is a bellows-shaped pipe or a multilayered pipe that is extendable on receipt of an operating gas supplied from the inflator.

In the vehicle seat of this structure, the first driving member is an inflator, and the first movable member is a bellows-shaped pipe or a multilayered pipe that is extendable on receipt of an operating gas supplied from the inflator.

Accordingly, due the inflator being driven at the time of a seat front side collision of the vehicle or at the time at which a seat front side collision is predicted, operating gas from the inflator is supplied to the bellows-shaped pipe or the multilayered pipe, and the bellows-shaped pipe or the multilayered pipe, which is disposed along the seatback side frame, extends toward the seat lower side. As a result, the seat lower side end portion of the extended bellows-shaped pipe or multilayered pipe is positioned at the seat front side of the engaging portion that is provided so as to extend toward the seat transverse direction inner side at the seat rear side of the seat cushion side frame.

Here, at the time of a seat front side collision of the vehicle, the seatback tilts forward. However, the seat lower side end portion of the bellows-shaped pipe or the multilayered pipe that has been extended abuts (is anchored on), from the seat front side, the engaging portion that is positioned further toward the seat lower side than the reclining rod, and forward tilting of the seatback is prevented or suppressed.

Further, in this vehicle seat, because the first movable member is made to be the bellows-shaped pipe or the multilayered pipe that extends due to the operating gas of the inflator, an increase in the mass of the vehicle seat can be suppressed more.

In a vehicle seat of a seventh aspect of the present disclosure, in the first aspect, the first movable member is a multilayered pipe having a seat lower side end portion that is anchored by a first anchor member, the multilayered pipe is extendable toward a seat lower side, the first driving member comprises a first urging member and a first releasing member, the first urging member urges the multilayered pipe toward a seat lower side, and the first releasing member releases an anchoring state of the first anchor member in a case in which a vehicle collision at a seat front side occurs or in a case in which a vehicle collision at the seat front side is predicted.

In the vehicle seat of this structure, the first movable member is a multilayered pipe whose seat lower side end portion is anchored by the first anchor member, and the multilayered pipe is extendable toward the seat lower side. The first driving member comprises the first urging member and the first releasing member, the first urging member urges the multilayered pipe toward the seat lower side, and the first releasing member releases the anchoring state of the first anchor member at the time of a seat front side collision or at the time at which a seat front side collision is predicted.

Accordingly, at the time of a seat front side collision of the vehicle or at the time when a seat front side collision is predicted, due to the first releasing member releasing the anchoring state of the first anchor member, the multilayered pipe, which is urged toward the seat lower side by the first urging member, is extended toward the seat lower side. As a result, the seat lower side end portion of the extended multilayered pipe is positioned at the seat front side of the engaging portion that is provided so as to protrude toward the seat transverse direction inner side at the seat rear side of the seat cushion side frame.

Here, at the time of a seat front side collision of the vehicle, the seatback tilts forward. However, the seat lower side end portion of the extended multilayered pipe abuts (is anchored on), from the seat front side, the engaging portion that is positioned further toward the seat lower side than the reclining rod, and forward tilting of the seatback is prevented or suppressed.

Further, in this vehicle seat, because the first movable member is made to be the multilayered pipe that extends, an increase in the mass of the vehicle seat can be suppressed more.

A vehicle seat of an eighth aspect of the present disclosure is a vehicle seat in which a restraining device is installed, the vehicle seat including: a seat cushion frame that forms a frame of a seat cushion, and that includes a seat cushion side frame that extends in a seat front-rear direction at a seat transverse direction end portion; a seatback frame that is supported swingably about a reclining rod, the reclining rod extends in a seat transverse direction at a seat rear end side of the seat cushion frame, and the seatback frame extends toward a seat upper side from a seat rear end side of the seat cushion frame, and includes a seatback side frame that extends in a seat vertical direction at a seat transverse direction end portion; a rod that is disposed along the seat cushion side frame, and that is positioned at a seat front side of the seatback side frame by swinging toward a seat upper side around a rotating shaft that extends in a seat transverse direction at a seat front side portion of the rod; and a driving unit that is configured to swing the rod toward the seat upper side in a case in which a vehicle collision at a seat front side occurs or in a case in which a vehicle collision at the seat front side is predicted.

In accordance with the vehicle seat of this structure, the restraining device, e.g., a seatbelt, is provided at the vehicle seat. Therefore, when the seatbelt restrains the vehicle occupant due to operation of a pretensioner or the like at the time of a collision of the vehicle from the seat front side, load toward the seat front side is inputted to the seatback via the seatbelt from the vehicle occupant who inertially moves.

The vehicle seat has the rod, which is disposed along the seat cushion side frame and is structured so as to swing freely around a rotating shaft that extends in the seat transverse direction at the seat front side portion of the rod, and the driving unit, which is configured to swing the rod toward the seat upper side at a time of a seat front side collision of the vehicle or at a time at which a seat front side collision is predicted. Accordingly, at the time of a seat front side collision of the vehicle or at the time when a seat front side collision is predicted, the rod is rotated toward the seat upper side by the driving unit. Due thereto, the seat rear side end portion of the rotated rod is positioned at the seat front side of the seatback side frame.

Accordingly, when the seatback tilts forward at the time of a seat front side collision of the vehicle, the seatback side frame is thrust against (is anchored on) the rod, and forward tilting of the seatback is prevented or suppressed.

Note that, at usual times, the rod is disposed along the seat cushion frame, and is not positioned at the seat front side of the seatback side frame. Therefore, swinging motion (the reclining operation) of the seatback is not impeded.

In a vehicle seat of a ninth aspect of the present disclosure, in the eighth aspect, the rod is provided at both seat transverse direction end portions of the seat cushion frame, and the driving unit is provided at both of the seat transverse direction end portions of the seat cushion frame, and the respective driving units is configured to swing the respective rods toward the seat upper side in a case in which a vehicle collision at a seat front side occurs or in a case in which a vehicle collision at the seat front side is predicted.

In this vehicle seat, the respective rods are disposed at both the seat transverse direction end portions of the seat cushion frame, and the respective driving units can swing the respective rods toward the seat upper side. Accordingly, at the time of a seat front side collision of the vehicle or at the time at which a seat front side collision is predicted, the respective driving units is configured to swing the respective rods toward the seat upper side, and position the respective rods at the seat front sides of the seatback side frames.

Accordingly, when the seatback tilts forward at the time of a seat front side collision of the vehicle, the seatback side frames are thrust against (are anchored on) the rods, and forward tilting of the seatback is prevented or suppressed more stably.

In a vehicle seat of a tenth aspect of the present disclosure, in the eighth aspect, the driving unit has a second movable member and a second driving member, the second movable member supports a seat rear side end portion of the rod from a seat lower side and is extendable toward the seat upper side, and the second driving member is configured to extend the second movable member in a case in which a vehicle collision at a seat front side occurs or in a case in which a vehicle collision at the seat front side is predicted.

In this vehicle seat, at the time of a seat front side collision of the vehicle or at the time at which a seat front side collision is predicted, the second movable member is extended toward the seat upper side by the second driving member. As a result, the rod, whose seat rear side end is supported by the second movable member, is swung toward the seat upper side. Due thereto, the seat rear side end portion of the rod that has been swung is positioned at the seat front side of the seatback side frame.

Accordingly, when the seatback tilts forward at the time of a seat front side collision of the vehicle, the seatback side frame is thrust against (is anchored on) the rod, and forward tilting of the seatback is prevented or suppressed.

In a vehicle seat of an eleventh aspect of the present disclosure, in the tenth aspect, the second driving member is an inflator that is operated in a case in which a vehicle collision at a seat front side occurs or in a case in which a vehicle collision at the seat front side is predicted, and the second movable member is a metal container that is extendable toward the seat upper side on receipt of an operating gas supplied from the inflator.

In this vehicle seat, the second driving member is an inflator, and the second movable member is a metal container that is extendable on receipt of the operating gas supplied from the inflator.

Accordingly, due the inflator being driven at the time of a seat front side collision of the vehicle or at the time at which a seat front side collision is predicted, operating gas from the inflator is supplied to the metal container, and the metal container extends toward the seat upper side. Due thereto, the rod, whose seat rear side end portion is supported at the metal container, is swung toward the seat upper side, and is positioned at the seat front side of the seatback side frame.

Here, when the seatback tilts forward at the time of a seat front side collision of the vehicle, the seatback side frame is thrust against (is anchored on) the rod, and forward tilting of the seatback is prevented or suppressed.

Further, in this vehicle seat, because the second movable member is made to be the metal container that extends due to the operating gas of the inflator, an increase in the mass of the vehicle seat can be suppressed.

In a vehicle seat of a twelfth aspect of the present disclosure, in the tenth aspect, the second driving member is an inflator that is operated in a case in which a vehicle collision at a seat front side occurs or in a case in which a vehicle collision at the seat front side is predicted, and the second movable member is a bellows-shaped pipe or a multilayered pipe that is extendable toward the seat upper side on receipt of an operating gas supplied from the inflator.

In this vehicle seat, the second driving member is an inflator, and the second movable member is a bellows-shaped pipe or a multilayered pipe that is extendable on receipt of the operating gas supplied from the inflator.

Accordingly, due to the inflator being driven at the time of a seat front side collision of the vehicle or at the time at which a seat front side collision is predicted, operating gas from the inflator is supplied to the bellows-shaped pipe or the multilayered pipe, and the bellows-shaped pipe or the multilayered pipe is extended toward the seat upper side. Due thereto, the rod, whose seat rear side end portion is supported at the bellows-shaped pipe or the multilayered pipe, is swung toward the seat upper side, and is positioned at the seat front side of the seatback side frame.

Here, when the seatback tilts forward at the time of a seat front side collision of the vehicle, the seatback side frame is thrust against (is anchored on) the rod, and forward tilting of the seatback is prevented or suppressed.

Here, in this vehicle seat, because the second movable member is made to be the bellows-shaped pipe or the multilayered pipe that extends due to the operating gas of the inflator, an increase in the mass of the vehicle seat can be suppressed.

In a vehicle seat of a thirteenth aspect of the present disclosure, in the tenth aspect, the second movable member is a multilayered pipe having a seat upper side end portion that is anchored by a second anchor member, the multilayered pipe is extendable toward a seat upper side, the second driving member comprises a second urging member and a second releasing member, the second urging member urges the multilayered pipe toward the seat upper side, and the second releasing member releases an anchoring state of the second anchor member in a case in which a vehicle collision at a seat front side occurs or in a case in which a vehicle collision at the seat front side is predicted.

In this vehicle seat, the second movable member is a multilayered pipe having a seat upper side end portion that is anchored by the second anchor member, and the multilayered pipe is extendable toward the seat upper side. The second driving member comprises the second urging member and the second releasing member. The second urging member urges the multilayered pipe toward the seat upper side, and the second releasing member releases the anchoring state of the second anchor member at the time of a seat front side collision or at the time at which a seat front side collision is predicted.

Accordingly, at the time of a seat front side collision of the vehicle or at the time when a seat front side collision is predicted, due to the second releasing member releasing the anchoring state of the second anchor member, the multilayered pipe, which is urged toward the seat upper side by the second urging member, is extended toward the seat upper side. As a result, the seat rear side of the rod is pushed-up toward the seat upper side by the multilayered pipe, and is positioned at the seat front side of the seatback side frame.

Accordingly, when the seatback tilts forward at the time of a seat front side collision of the vehicle, the seatback side frame is thrust against (is anchored on) the rod, and forward tilting of the seatback is prevented or suppressed.

Here, in this vehicle seat, because the second movable member is made to be the multilayered pipe that extends, an increase in the mass of the vehicle seat can be suppressed.

Note that, from the eighth aspect to the thirteenth aspect, "the seatback side frame is thrust against (is anchored on) the rod" means that the seatback side frame is thrust against the rod via the pad and/or the skin of the seat cushion and/or the seatback.

Because the vehicle seats of the various aspects of the present disclosure are structured as described above, forward tilting of the seat at the time of a vehicle collision can be prevented or suppressed while an increase in the mass of the vehicle seat is suppressed.

BRIEF DESCRIPTION OF THE DRAWINGS

Preferred embodiments will be described in detail based on the following figures, wherein:

FIG. 15A is a side sectional view that corresponds to FIG. 4A and illustrates the usual state (a state not at the time of a seat front side collision) of a vehicle seat relating to a second variation of the second embodiment;

FIG. 16A is a side sectional view that corresponds to FIG. 4A and illustrates the usual state (a state not at the time of a seat front side collision) of a vehicle seat relating to a third variation of the second embodiment;

FIG. 16B is a side sectional view that corresponds to FIG. 4B and illustrates the state at the time of a seat front side collision of the vehicle seat relating to the third variation of the second embodiment;

FIG. 17A is a side sectional view that corresponds to FIG. 4A and illustrates the usual state (a state not at the time of a seat front side collision) of a vehicle seat relating to a fourth variation of the second embodiment.

DETAILED DESCRIPTION

First Embodiment

A vehicle seat relating to a first embodiment of the present invention is described with reference to FIG. 1 through FIG. 10. The respective drawings are schematic drawings, and illustration of portions having little relation to the present embodiment is omitted. Note that, in the respective drawings, arrow FR indicates the vehicle front side, arrow W indicates the vehicle transverse direction, and arrow UP indicates the vehicle upper side. Further, in the respective embodiments, the seat front side, the seat transverse direction and the seat upper side substantially coincide with the vehicle front side, the vehicle transverse direction and the vehicle upper side, respectively, and therefore are also standardly expressed as the vehicle front side, the vehicle transverse direction and the vehicle upper side.

(Structure)

Figure 1:
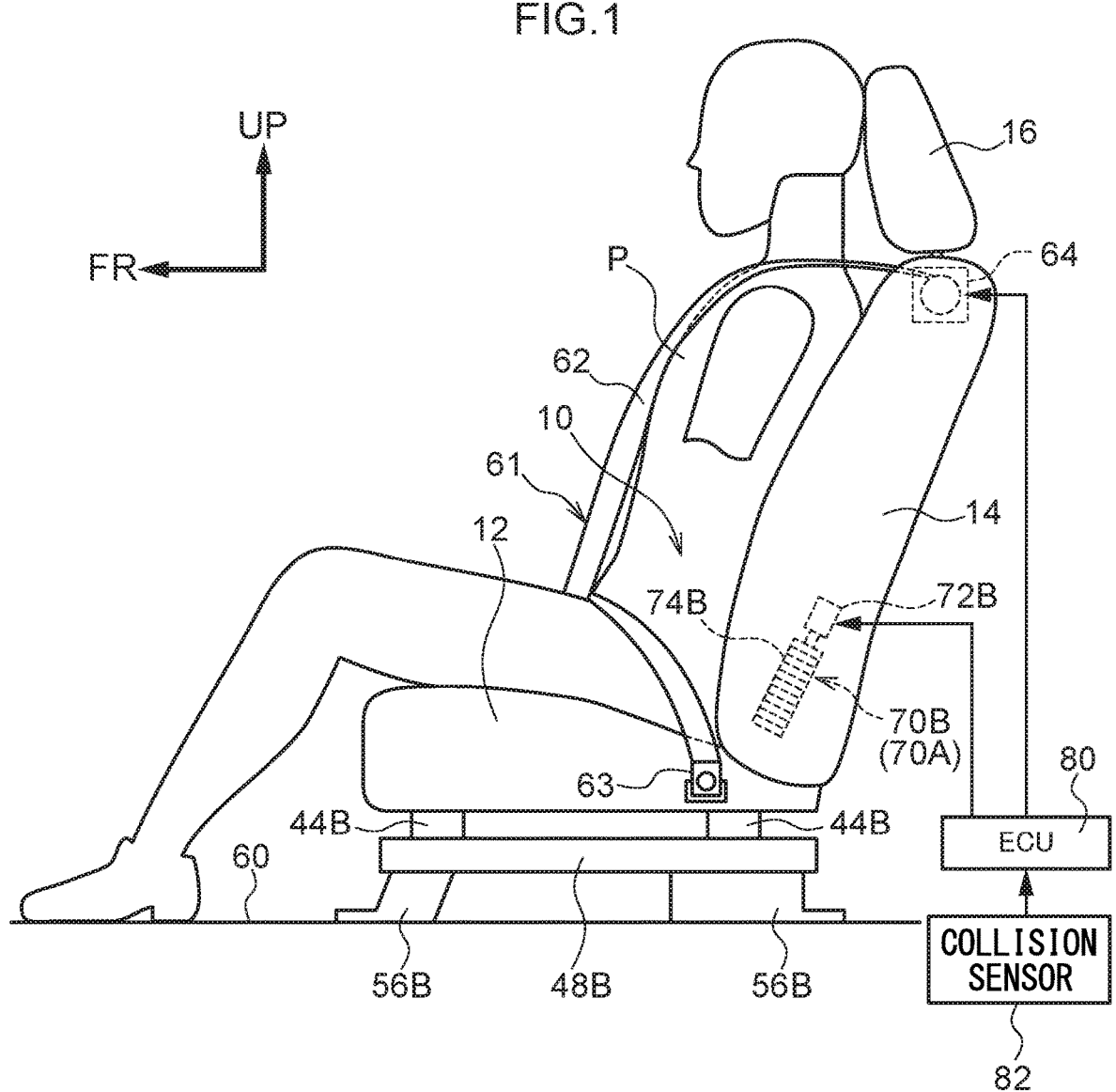
FIG. 1 is a side view showing a state in which a vehicle occupant is seated in a vehicle seat relating to a first embodiment.

As shown in FIG. 1, a vehicle seat 10 of an automobile relating to the present embodiment is provided as a front passenger's seat which locates at a vehicle left side at the front seat in the cabin.

As shown in FIG. 1, the vehicle seat 10 has a seat cushion 12 on which a vehicle occupant P sits, a seatback 14 that supports a back portion of the vehicle occupant P at a rear end portion of the seat cushion 12, and a headrest 16 that is disposed at an upper end portion of the seatback 14 and supports a head portion of the vehicle occupant P.

Figure 3:
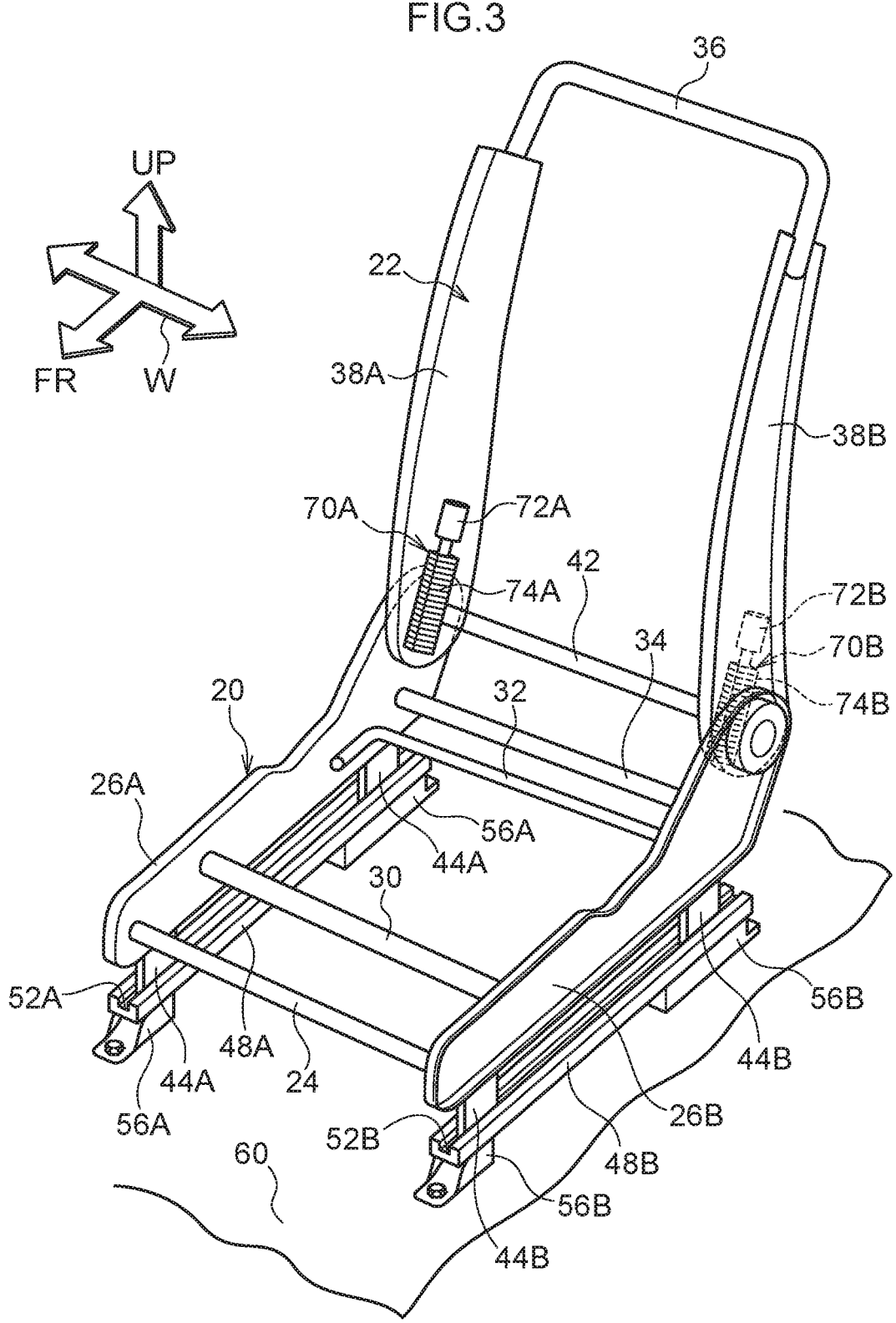
FIG. 3 is a perspective view showing a seat frame structure of the vehicle seat relating to the first embodiment.

As shown in FIG. 3, a seat cushion frame 20 and a seatback frame 22, which is pivotally supported so as to be able to swing at a reclining rod 42 that is described later at a rear end side of the seat cushion frame 20, are disposed at an interior of the vehicle seat 10 (the seat cushion 12 and the seatback 14).

As shown in FIG. 3, the seat cushion frame 20 has a front frame 24 that extends in the vehicle transverse direction at a vehicle front side, and a pair of side frames 26A, 26B that extend toward the vehicle rear side from the vehicle transverse direction both end portions of the front frame 24. Further, plural cross members 30, 32, 34, which extend in the seat transverse direction and span between the pair of side frames 26A, 26B, are provided at the seat cushion frame 20 at a vehicle rear side of the front frame 24. Note that the cross member 34 that is the furthest toward the vehicle rear side is called "a rear cross member 34" hereinafter. Further, the side frames 26A, 26B correspond to the "seat cushion side frames", and the rear cross member 34 corresponds to the "engaging portion".

The seatback frame 22 has an upper frame 36 which extends in the vehicle transverse direction at an upper end of the seatback frame 22, a pair of side frames 38A, 38B which extend toward a vehicle lower side from the vehicle transverse direction both end portions of the upper frame 36, and the reclining rod 42 that extends in the vehicle transverse direction between the vehicle lower end portions of the side frames 38A, 38B. The side frames 38A, 38B correspond to the "seatback side frames".

As shown in FIG. 3, due to the reclining rod 42 being pivotally supported between the rear end portions of the side frames 26A, 26B, the seatback frame 22 (the seatback 14) can swing around the reclining rod 42 with respect to the seat cushion frame 20 (the seat cushion 12).

Note that, at the vehicle seat 10, upper rails 44A, 44B, which are formed at vehicle lower portions of the side frames 26A, 26B respectively, are inserted in rail grooves 52A, 52B of lower rails 48A, 48B that extend in the vehicle front-rear direction. Namely, the vehicle seat 10 is structured so as to be slidable in the vehicle front-rear direction on the lower rails 48A, 48B. The lower rails 48A, 48B are mounted to a floor panel 60 via pairs of mounting portions 56A, 56B, respectively.

Figure 2:
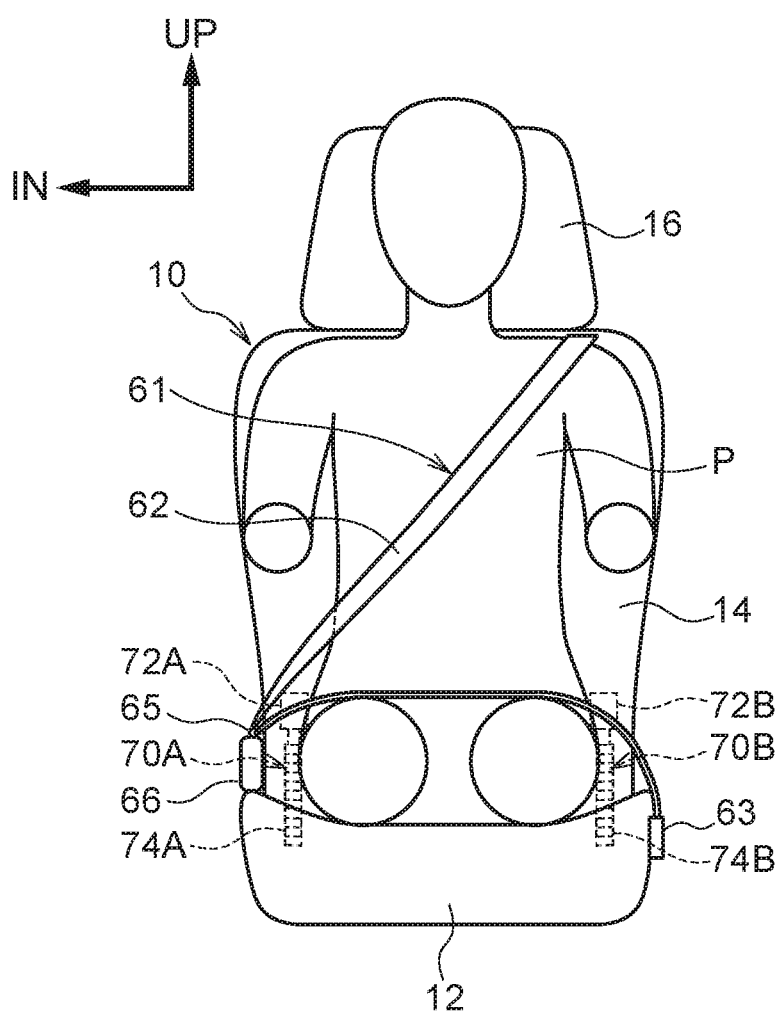
FIG. 2 is a front view showing the time of a seat front side collision in the state in which the vehicle occupant is seated in the vehicle seat relating to the first embodiment.

Further, as shown in FIG. 1 and FIG. 2, a seatbelt device 61 that is a so-called three-point seatbelt device is provided at the vehicle seat 10. The seatbelt device 61 is structured to include a seatbelt (webbing) 62, an anchor plate 63 at which one end of the seatbelt 62 is anchored, a retractor 64 (see FIG. 2), which has a pretensioner and is provided within the seatback 14 and at which another end of the seatbelt 62 is anchored and which imparts a predetermined tension to the seatbelt 62, and a buckle 66 to which a tongue plate 65, through which the seatbelt 62 is inserted, is fixed to due to the tongue plate 65 being fit in the buckle 66. Note that the anchor plate 63 is mounted to the side frame 26B. Namely, the entire seatbelt device 61 is installed at the vehicle seat 10. This seatbelt device 61 corresponds to the "restraining device".

Figure 4A:
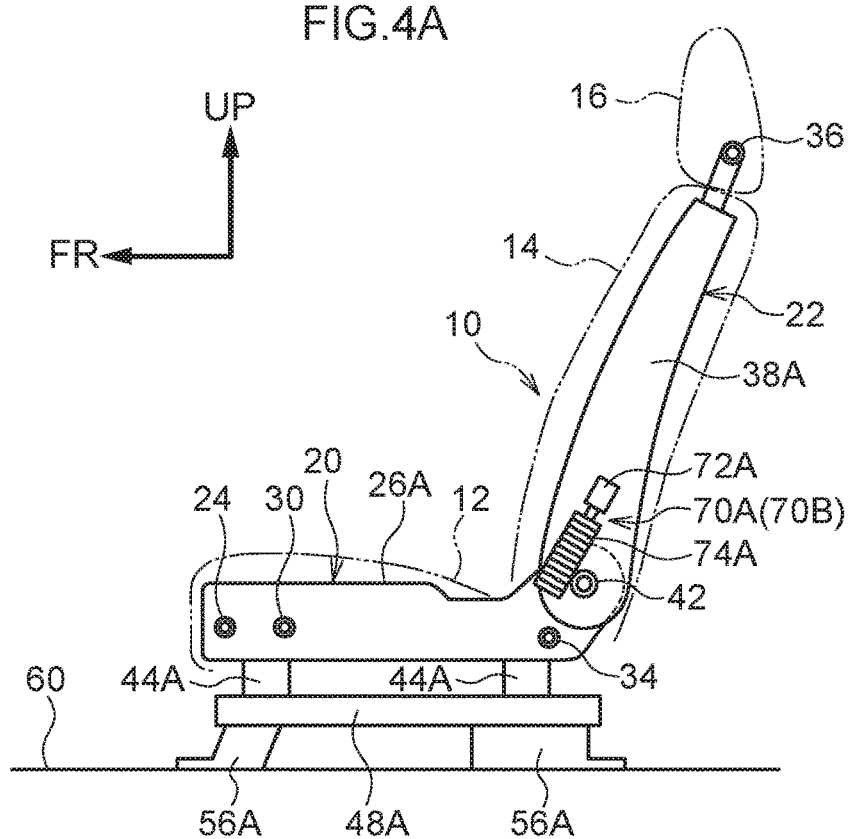
FIG. 4A is a side sectional view in which the vehicle seat relating to the first embodiment is cut at the seat transverse direction center and that schematically shows the seat frame at the vehicle transverse direction inner side, and illustrates a usual state (a state not at the time of a seat front side collision) of the vehicle seat.
Figure 4B:
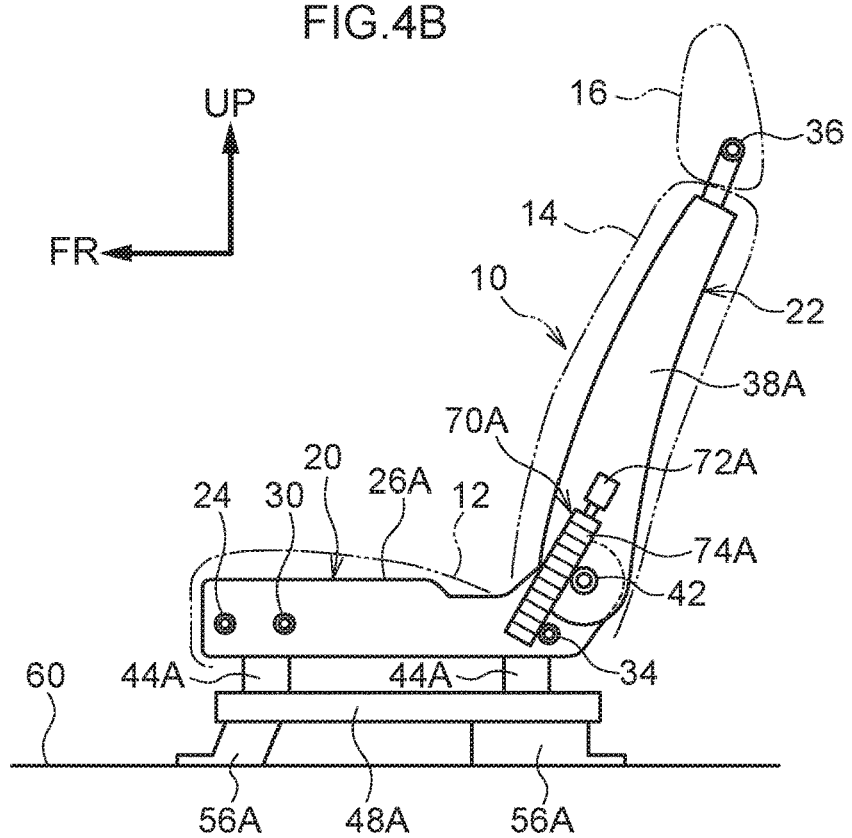
FIG. 4B is a side sectional view in which the vehicle seat relating to the first embodiment is cut at the seat transverse direction center and that schematically shows the seat frame at the vehicle transverse direction inner side, and illustrates a state at the time of a seat front side collision of the vehicle seat.

Further, as shown in FIG. 3 and FIG. 4A, forward tilting preventing units 70A, 70B are provided at the vehicle transverse direction inner sides of the side frames 38A, 38B of the seatback frame 22, in vicinities of the vehicle lower side end portions thereof and along the side frames 38A, 38B.

Note that, because the structure of the forward tilting preventing unit 70B is similar to that of the forward tilting preventing unit 70A, structural elements of the forward tilting preventing unit 70B that are similar to those of the forward tilting preventing unit 70A are denoted by the same reference numbers except with a B appended thereto, and description thereof is omitted.

The forward tilting preventing unit 70A is structured from an inflator 72A and a metal container 74A that is an airbag that is made of metal and that extends due to operating gas that is supplied from the inflator 72A to the metal container 74A. The inflator 72A (72B) corresponds to the "first driving member", and the metal container 74A (74B) corresponds to the "first movable member".

The forward tilting preventing unit 70A is disposed at the vehicle lower side portion of the side frame 38A along the direction in which the side frame 38A extends. The upper portion of the metal container 74A is connected to the inflator 72A. Due to a supply of operating gas from the inflator 72A, the metal container 74A extends toward the vehicle lower side, and the lower end portion of the extended metal container 74A is positioned at a vehicle front side of the rear cross member 34 (see FIG. 4B).

Further, because the metal container 74A of the forward tilting preventing unit 70A is positioned at a vehicle front side of the reclining rod 42, the metal container 74A does not interfere with the reclining rod 42 even if the metal container 74A is extended toward the vehicle lower side.

As shown in FIG. 1, the retractor 64 (pretensioner) and the forward tilting preventing unit 70A (the inflator 72A) are electrically connected to an ECU 80. A collision sensor 82 is electrically connected to the ECU 80. The collision sensor 82 outputs, to the ECU 80, a signal that corresponds to the absence/presence of a collision to the automobile and the state of the collision. When a front collision is detected, the ECU 80 outputs driving signals to the retractor 64 and the forward tilting preventing units 70A, 70B. Note that illustration of the ECU 80 and the collision sensor 82 is omitted in the other drawings.

(Operation)

Operation and effects of the vehicle seat 10 that is structured in this way are described.

In a case in which the ECU 80 detects a front collision to the automobile on the basis of an input signal from the collision sensor 82 that structures the vehicle seat 10, driving signals are outputted from the ECU 80 to the retractor 64 (the pretensioner) and the forward tilting preventing units 70A, 70B (the inflator 72A). Due thereto, the pretensioner of the retractor 64 is operated, the seatbelt 62 is taken-up, and the vehicle occupant P is restrained (see FIG. 1 and FIG. 2).

Due to a driving signal from the ECU 80, the inflator 72A supplies operating gas to the metal container 74A. As a result, the metal container 74A expands, and extends toward the seat lower side (refer to FIG. 4B). Namely, the vehicle lower side end portion of the metal container 74A that has extended is positioned at the vehicle front side of the rear cross member 34 of the seat cushion frame 20.

Here, even if load toward the vehicle front side is inputted to the upper portion of the seatback 14 via the seatbelt 62 due to inertial movement of the vehicle occupant P that is caused by the front collision, and a moment in the forward tilting direction is applied to the seatback 14 (the seatback frame 22), the vehicle lower side end portion of the metal container 74A abuts (is anchored on) the rear cross member 34 from the vehicle front side, at further toward the vehicle lower side than the reclining rod 42. Accordingly, forward tilting of the seatback 14 can be prevented or suppressed.

Further, in order to suppress forward tilting of the seatback 14, merely the forward tilting preventing unit 70A, which is formed from the metal container 74A that is an airbag made of metal, is added. Therefore, the rigidity of the seat (the seatback) is improved while an increase in the mass of the vehicle seat 10 is suppressed, and forward tilting of the seatback 14 can be prevented or suppressed.

Moreover, at a time when the forward tilting preventing unit 70A is not operating, the vehicle lower side end portion of the metal container 74A is not positioned at the vehicle front side of the rear cross member 34. Therefore, when the seatback 14 is swung at the time of a reclining operation or the like, the rear cross member 34 does not interfere with the metal container 74A, and the swinging operation of the seatback 14 is not impeded.

(First Variation)

Figure 5A:
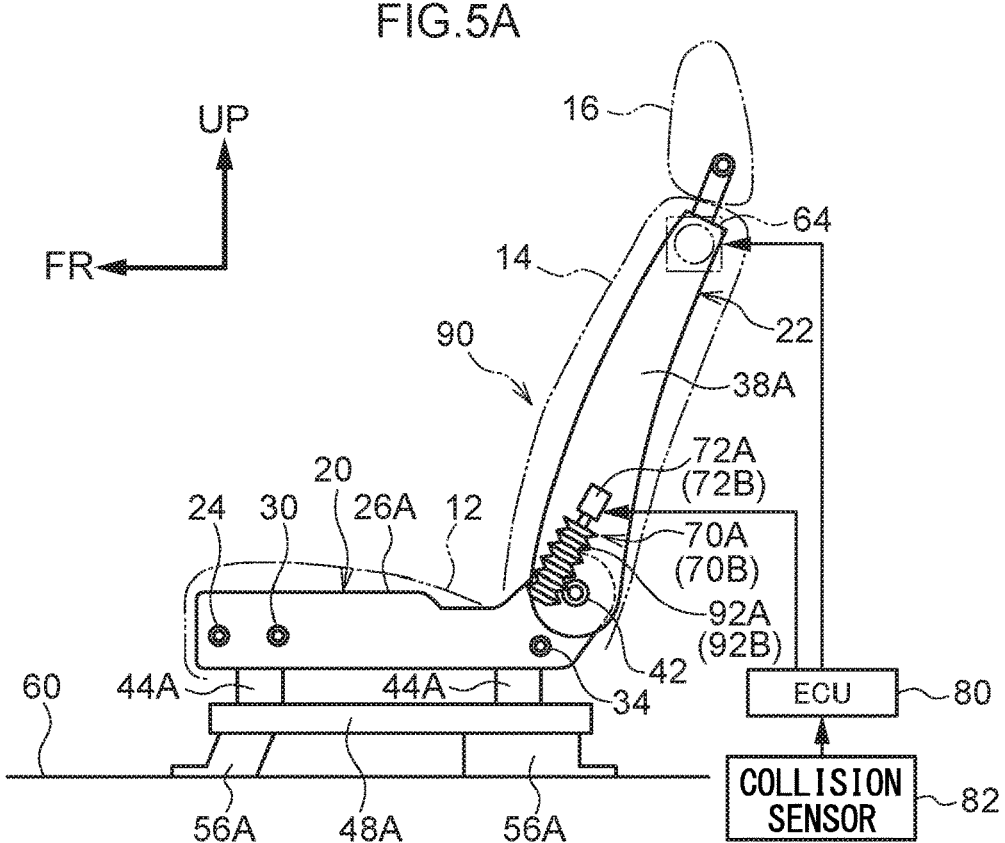
FIG. 5A is a side sectional view that corresponds to FIG. 4A and illustrates the usual state (a state not at the time of a seat front side collision) of a vehicle seat relating to a first variation of the first embodiment.
Figure 5B:
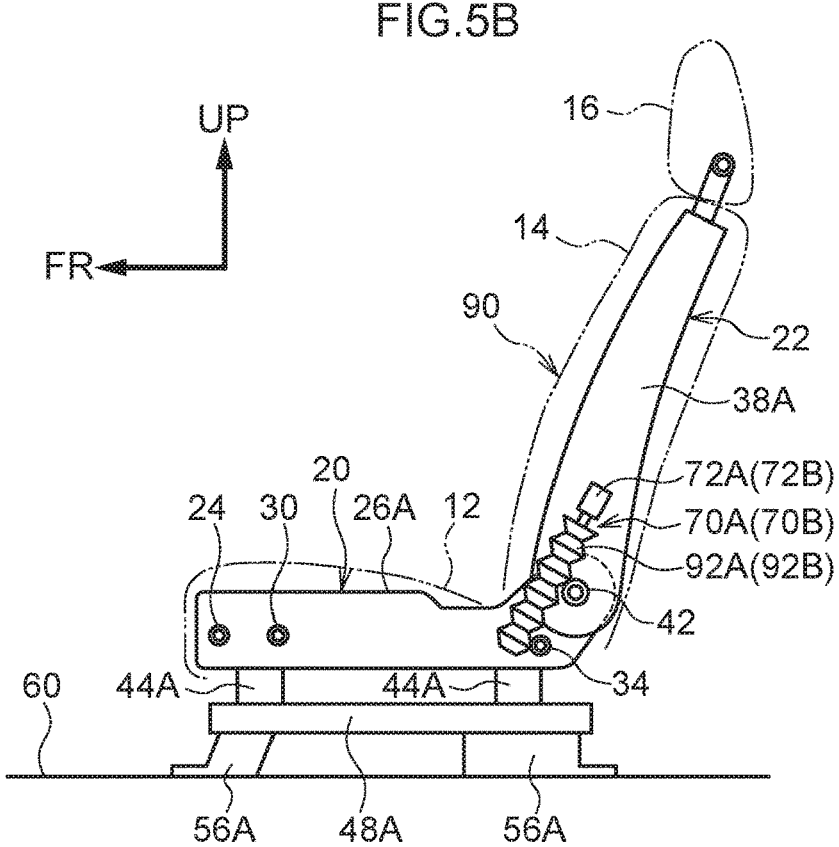
FIG. 5B is a side sectional view that corresponds to FIG. 4B and illustrates the state at the time of a seat front side collision of the vehicle seat relating to the first variation of the first embodiment.

As shown in FIG. 5A, a vehicle seat 90 relating to a first variation uses pipes 92A, 92B, which are shaped as bellows and are made of metal, instead of the metal containers 74A, 74B that are metal airbags that structure the forward tilting preventing units 70A, 70B of the first embodiment. These bellows-shaped pipes 92A, 92B correspond to the "first movable members".

In this case as well, due to driving signals from the ECU 80 at the time of a collision, operating gas is supplied to the bellows-shaped pipes 92A, 92B from the inflators 72A, 72B. Due thereto, the bellows-shaped pipes 92A, 92B extend toward the vehicle lower side, and the lower end portions thereof are positioned at the vehicle front side of the rear cross member 34. Due thereto, even if impact load due to inertial movement of the vehicle occupant at the time of a collision is inputted to the seatback 14 and the seatback 14 tilts forward, forward tilting of the seatback 14 is prevented or suppressed due to the bellows-shaped pipes 92A, 92B abutting (being anchored on) the rear cross member 34.

Further, in order to suppress forward tilting of the seatback 14, merely the bellows-shaped pipes 92A, 92B, which extend due to the operating gas, are added. Therefore, the rigidity of the seat (the seatback) is improved while an increase in the mass of the vehicle seat 90 is suppressed, and forward tilting of the seatback 14 can be prevented or suppressed.

(Second Variation)

Figure 6A:
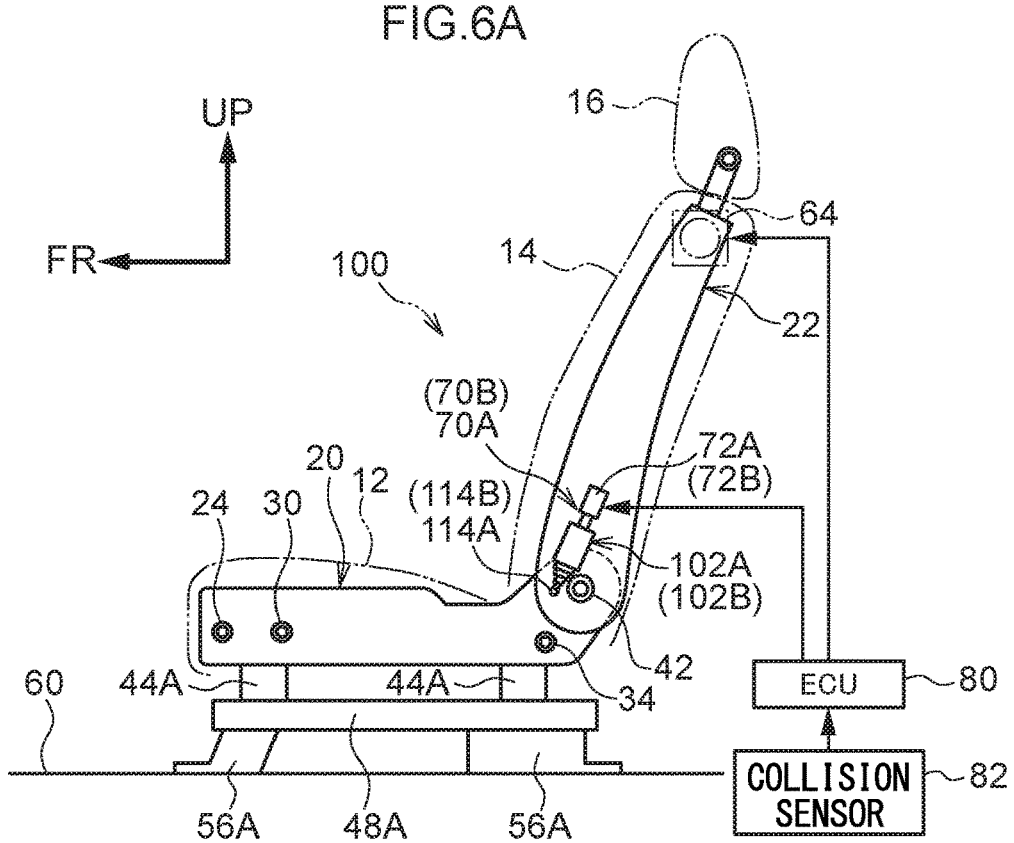
FIG. 6A is a side sectional view that corresponds to FIG. 4A and illustrates the usual state (a state not at the time of a seat front side collision) of a vehicle seat relating to a second variation of the first embodiment.

As shown in FIG. 6A, in a vehicle seat 100 relating to a second variation, the metal containers 74A, 74B that structure the forward tilting preventing units 70A, 70B of the first embodiment are replaced with multilayered pipes 102A, 102B. These multilayered pipes 102A, 102B correspond to the "first movable members".

Because the structure of the multilayered pipe 102B is similar to that of the multilayered pipe 102A, structural elements of the multilayered pipe 102B that are the same as those of the multilayered pipe 102A are denoted by the same reference numbers except with a B appended thereto, and detailed description thereof is omitted.

Figure 6B:
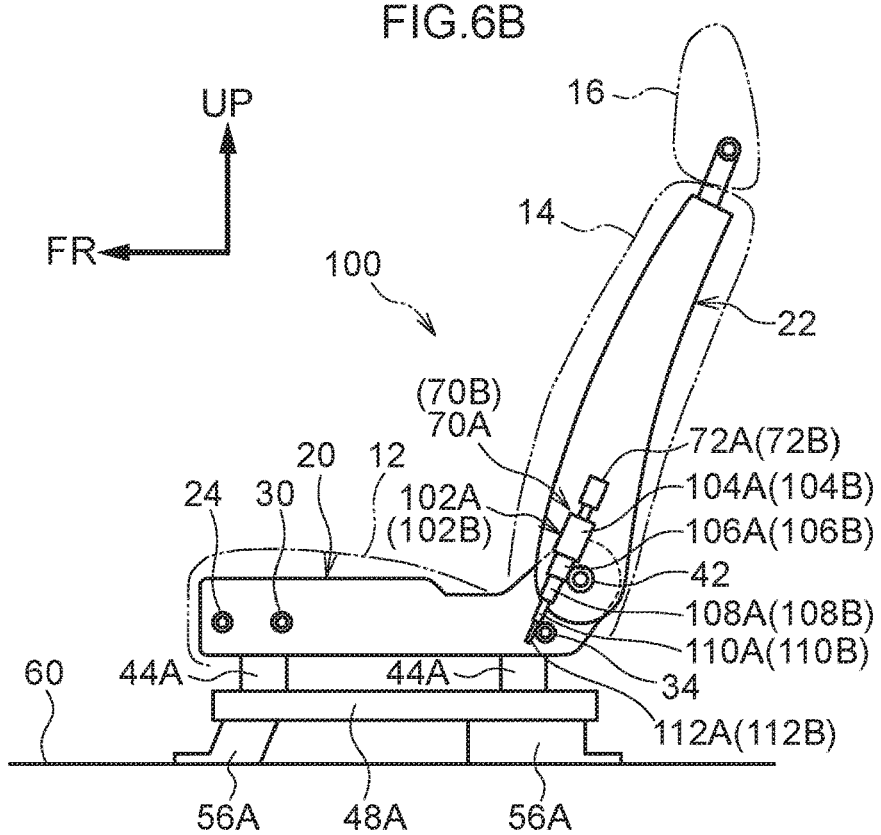
FIG. 6B is a side sectional view that corresponds to FIG. 4B and illustrates the state at the time of a seat front side collision of the vehicle seat relating to the second variation of the first embodiment.

As shown in FIG. 6B, the multilayered pipe 102A has a first pipe 104A that is the outermost pipe, a second pipe 106A that is slidably disposed within the first pipe 104A and whose diameter is smaller than that of the first pipe 104A, a third pipe 108A that is slidably disposed within the second pipe 106A and whose diameter is smaller than that of the second pipe 106A, a fourth pipe 110A that is slidably disposed within the third pipe 108A and whose diameter is smaller than that of the third pipe 108A, and a fifth pipe 112A that is slidably disposed within the fourth pipe 110A and whose diameter is smaller than that of the fourth pipe 110A.

Further, as shown in FIG. 6A, the lower end of the fifth pipe 112A of the multilayered pipe 102A is anchored by an anchor pin 114A.

Moreover, the upper portion of the multilayered pipe 102A communicates with the inflator 72A. When operating gas is supplied from the inflator 72A, the multilayered pipe 102A breaks the anchor pin 114A and extends toward the vehicle lower side.

In this case as well, due to a driving signal from the ECU 80 at the time of a front collision, operating gas is supplied from the inflator 72A to the multilayered pipe 102A, and the multilayered pipe 102A breaks the anchor pin 114A, and the second pipe 106A through the fifth pipe 112A of the multilayered pipe 102A successively extend toward the vehicle lower side, and the fifth pipe 112A, which is at the lowest end portion thereof, is positioned at the vehicle front side of the rear cross member 34 (refer to FIG. 6B).

When impact load that is due to inertial movement of the vehicle occupant is inputted to the seatback 14 at the time of a front collision of the vehicle, the seatback 14 starts to tilt forward. However, the fifth pipe 112A of the multilayered pipe 102A abuts (is anchored on) the rear cross member 34 from the vehicle front side. Due thereto, forward tilting of the seatback 14 is prevented or suppressed.

Further, in order to suppress forward tilting of the seatback 14, merely the multilayered pipe 102A, which extends due to the operating gas, is added. Therefore, the rigidity of the seat (the seatback) is improved while an increase in the mass of the vehicle seat 100 is suppressed, and forward tilting of the seatback 14 can be prevented or suppressed.

(Third Variation)

Figure 7:
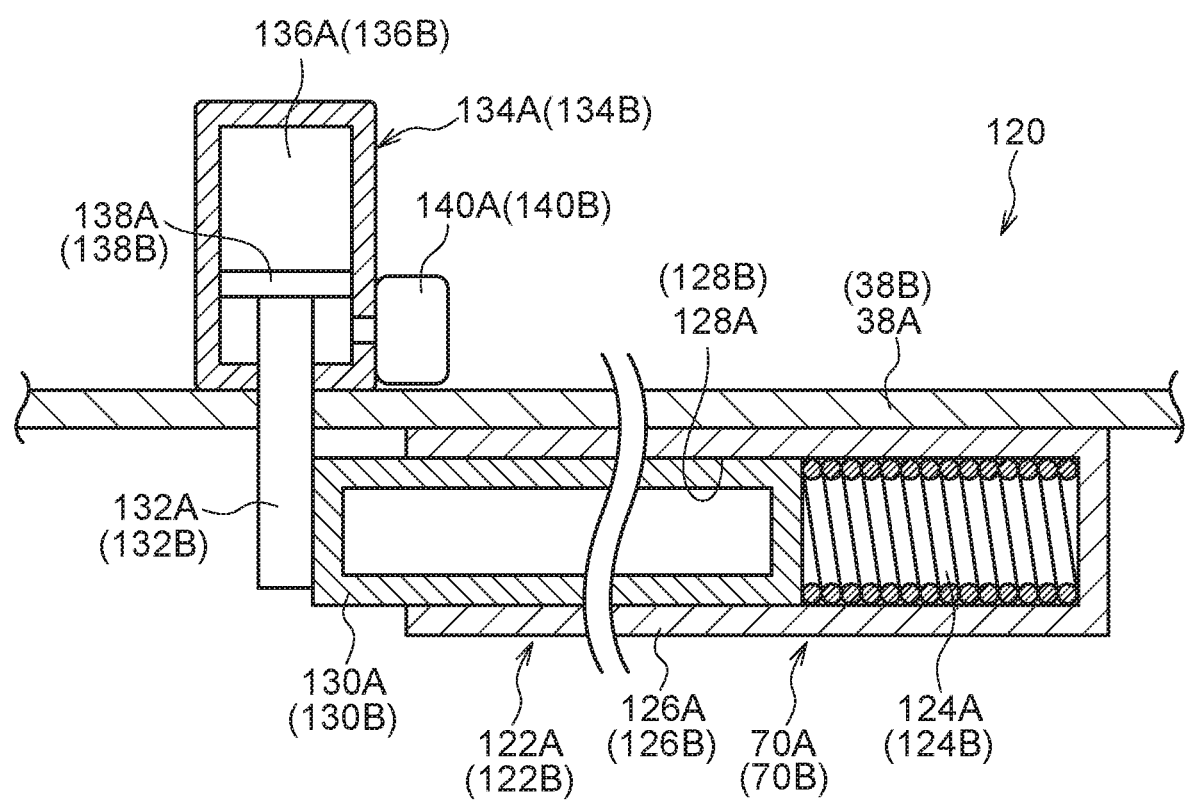
FIG. 7 is a schematic sectional view of a movable member of a vehicle seat relating to a third variation of the first embodiment.
Figure 8A:
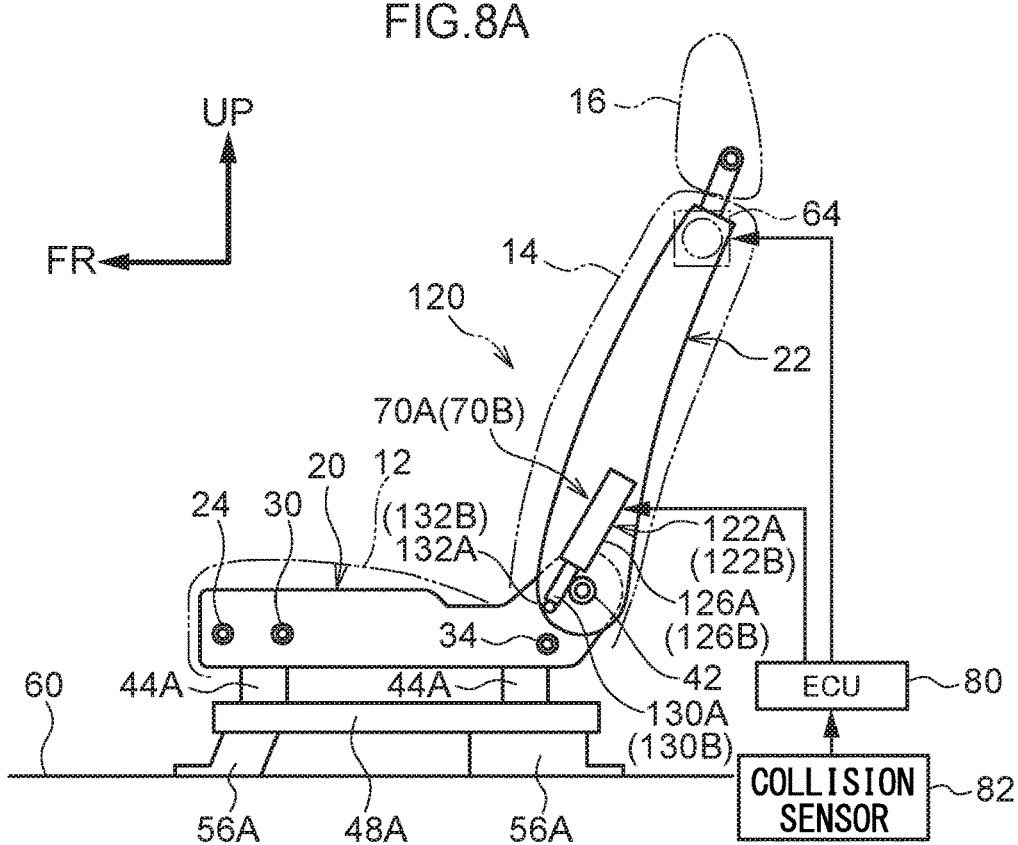
FIG. 8A is a side sectional view that corresponds to FIG. 4A and illustrates the usual state (a state not at the time of a seat front side collision) of the vehicle seat relating to the third variation of the first embodiment.

As shown in FIG. 7 and FIG. 8A, at a vehicle seat 120 relating to a third variation, the forward tilting preventing units 70A, 70B of the first embodiment are structured by multilayered pipes 122A, 122B and coil springs 124A, 124B. The multilayered pipes 102A, 102B correspond to the "first movable members", and the coil springs 124A, 124B correspond to the "first urging members" and the "first driving members".

Hereinafter, because the structure of the forward tilting preventing unit 70B is similar to that of the forward tilting preventing unit 70A, structural elements of the forward tilting preventing unit 70B that are the same as those of the forward tilting preventing unit 70A are denoted by the same reference numbers except with a B appended thereto, and detailed description thereof is omitted.

The multilayered pipe 122A has a first pipe 126A that is the outermost pipe and is mounted to the side frame 38A, and a second pipe 130A that is slidably disposed within a hole portion 128A of the first pipe 126A and whose diameter is smaller than that of the first pipe 126A. The coil spring 124A that is compressed is disposed at a back side of the hole portion 128A of the first pipe 126A, and always urges the second pipe 130A toward the vehicle lower side.

An anchor pin 132A is disposed at the vehicle lower end portion of the second pipe 130A of the multilayered pipe 122A, and anchors the second pipe 130A that is urged by the coil spring 124A. This anchor pin 132A (132B) corresponds to the "first anchor member".

The anchor pin 132A passes-through the side frame 38A, and an end portion thereof is positioned within a micro gas generator (hereinafter called "MGG") 134A that is provided at the opposite side from the anchor pin 132A of the side frame 38A. This MGG 134A corresponds to the "first releasing member" and the "first driving member".

A plate 138A that is provided at the end portion of the anchor pin 132A is slidably disposed within a sliding chamber 136A that is rectangular of the MGG 134A. A gas generator 140A communicates with a side frame 38A side of the sliding chamber 136A that is sectioned by the plate 138A. As shown in FIG. 8A, the gas generator 140A is connected to the ECU 80. Due to a driving signal being inputted to the gas generator 140A at the time of a collision, operating gas is supplied to the side frame 38A side of the sliding chamber 136A, and the anchor pin 132A withdraws from the lower end of the second pipe 130A.

In this case as well, as shown in FIG. 7, at the time of a front collision, a driving signal is inputted from the ECU 80 to the gas generator 140A, and operating gas is supplied from the gas generator 140A into the sliding chamber 136A. Due thereto, the anchor pin 132A withdraws from the lower end of the second pipe 130A. As a result, the second pipe 130A that is urged by the coil spring 124A moves toward the vehicle lower side, and is positioned at the vehicle front side of the rear cross member 34 (see FIG. 8B).

Due thereto, even if impact load due to inertial movement of the vehicle occupant is inputted to the seatback 14 at the time of a collision and the seatback 14 tilts forward, the second pipes 130A, 130B of the multilayered pipes 122A, 122B that have been extended abut (are anchored on) the rear cross member 34, and forward tilting of the seatback 14 is thereby prevented or suppressed.

(Fourth Variation)

Figure 9A:
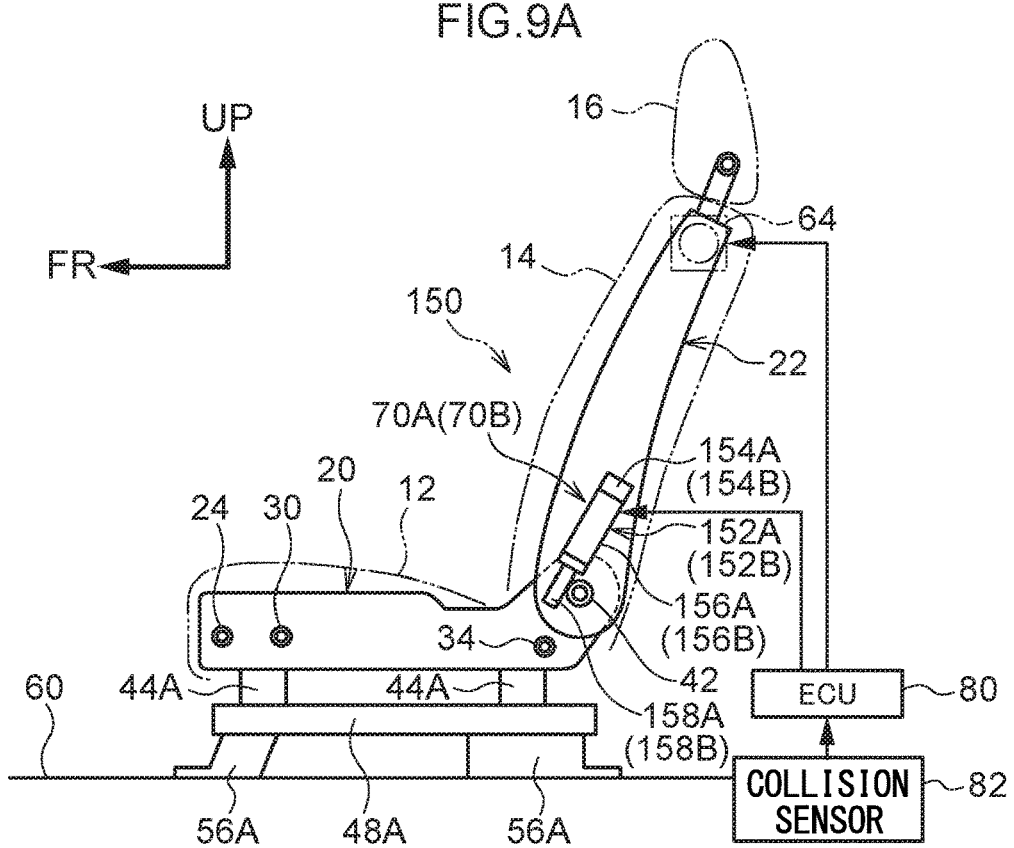
FIG. 9A is a side sectional view that corresponds to FIG. 4A and illustrates the usual state (a state not at the time of a seat front side collision) of a vehicle seat relating to a fourth variation of the first embodiment.
Figure 9B:
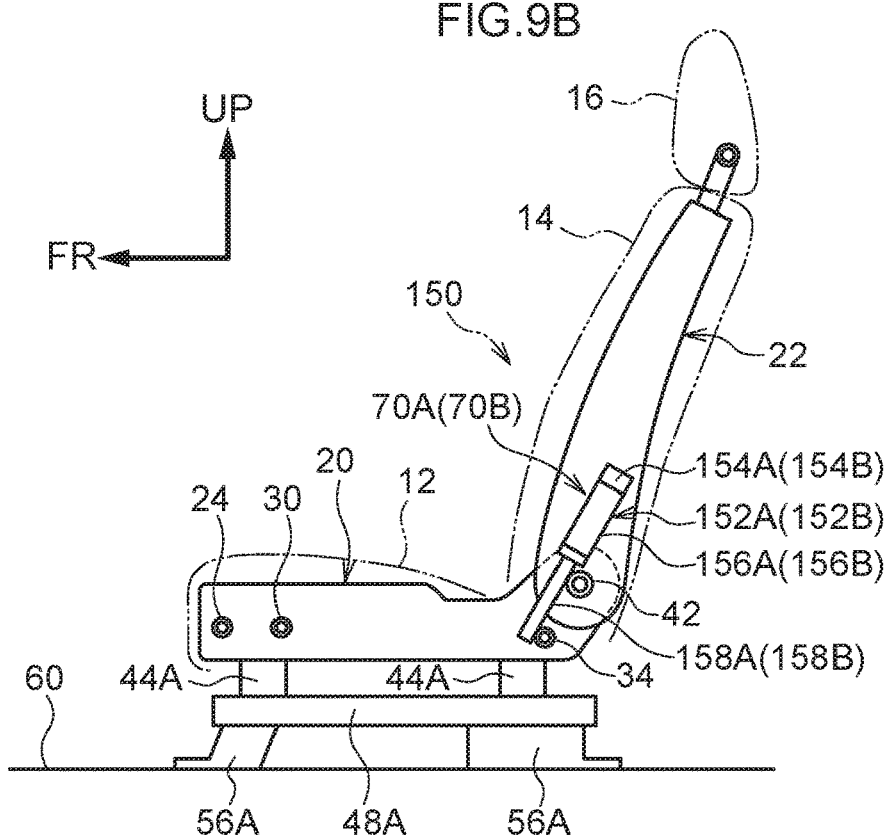
FIG. 9B is a side sectional view that corresponds to FIG. 4B and illustrates the state at the time of a seat front side collision of the vehicle seat relating to the fourth variation of the first embodiment.

As shown in FIG. 9A, at a vehicle seat 150 relating to a fourth variation, the forward tilting preventing units 70A, 70B of the first embodiment are structured by actuators 152A, 152B.

Hereinafter, because the structure of the forward tilting preventing unit 70B is similar to that of the forward tilting preventing unit 70A, structural elements of the forward tilting preventing unit 70B that are the same as those of the forward tilting preventing unit 70A are denoted by the same reference numbers except with a B appended thereto, and detailed description thereof is omitted.

The actuator 152A has a motor 154A, and a rod 158A that, due to the driving of the motor 154A, projects-out toward the vehicle lower side from an interior of a cylinder 156A. Note that ECU 80 is connected to the motor 154A of the actuator 152A.

Figure 8B:
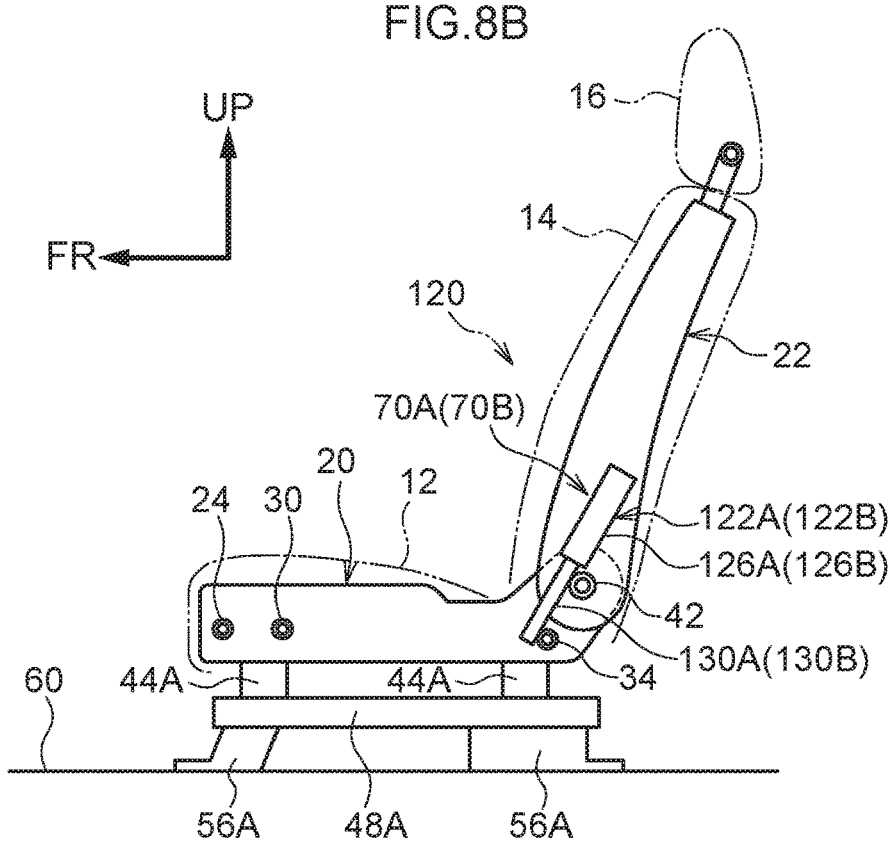
FIG. 8B is a side sectional view that corresponds to FIG. 4B and illustrates the state at the time of a seat front side collision of the vehicle seat relating to the third variation of the first embodiment.

In this case as well, at the time of a collision, the motor 154A is driven by a driving signal of the ECU 80, and the rod 158A projects-out toward the vehicle lower side from the cylinder 156A and is positioned at the vehicle front side of the rear cross member 34 (see FIG. 8B).

Due thereto, even if impact load due to inertial movement of the vehicle occupant is inputted to the seatback 14 at the time of a collision and the seatback 14 tilts forward, forward tilting of the seatback 14 is prevented or suppressed due to the rods 158A, 158B that have been projected-out abutting (being anchored on) the rear cross member 34 from the seat front side.

(Fifth Variation)

Figure 10:
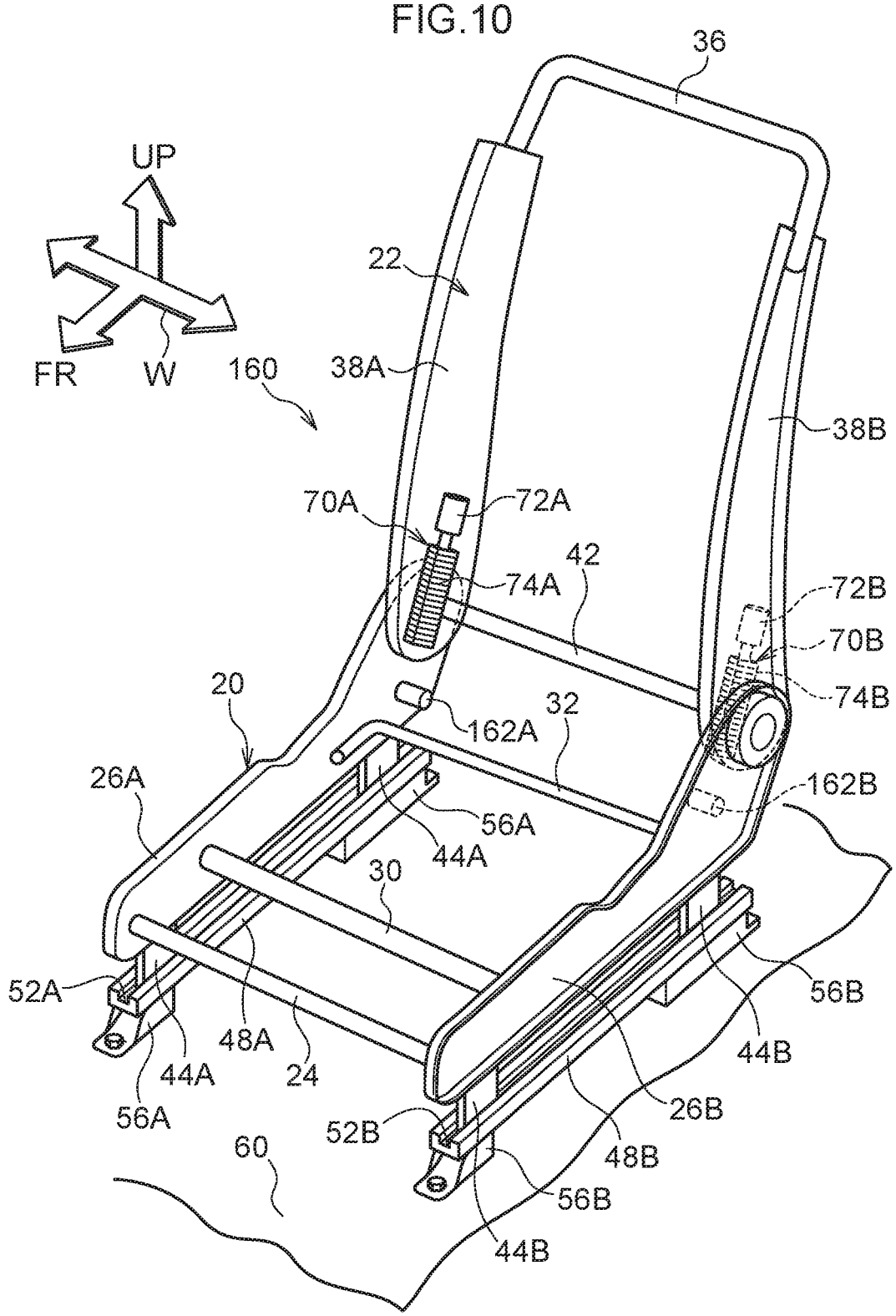
FIG. 10 is a perspective view showing a seat frame structure for a vehicle seat relating to a fifth variation of the first embodiment.

As shown in FIG. 10, in a vehicle seat 160 relating to a fifth variation, instead of the rear cross member 34 relating to the first embodiment, pins 162A, 162B are formed so as to protrude toward a vehicle transverse (seat transverse) direction inner side from the side frames 26A, 26B at positions that are at the vehicle rear sides of the forward tilting preventing units 70A, 70B that have been extended.

In this case as well, operating gas is supplied from the inflators 72A, 72B to the metal containers 74A, 74B due to driving signals from the ECU 80 at the time of a collision, and the metal containers 74A, 74B extend toward the vehicle lower side, and the lower end portions thereof are positioned at vehicle front sides of the pins 162A, 162B. Due thereto, even if impact load due to inertial movement of the vehicle occupant is inputted to the seatback 14 at the time of a collision and the seatback 14 tilts forward, forward tilting of the seatback 14 is prevented or suppressed due to the lower end portions of the extended metal containers 74A, 74B abutting (being anchored on) the pins 162A, 162B.

Further, lightening of the weight of the vehicle seat 160 can be devised by forming the pins 162A, 162B, which are short as compared with the rear cross member 34, at the side frames 26A, 26B.

Second Embodiment

A vehicle seat 170 relating to a second embodiment of the present invention is described with reference to FIG. 11 through FIG. 17. Because only the forward tilting preventing units differ from the vehicle seat 10 of the first embodiment, only these portions are described. Structural elements that are similar to those of the first embodiment are denoted by the same reference numerals, and detailed description thereof is omitted.

(Structure)

Figure 11:
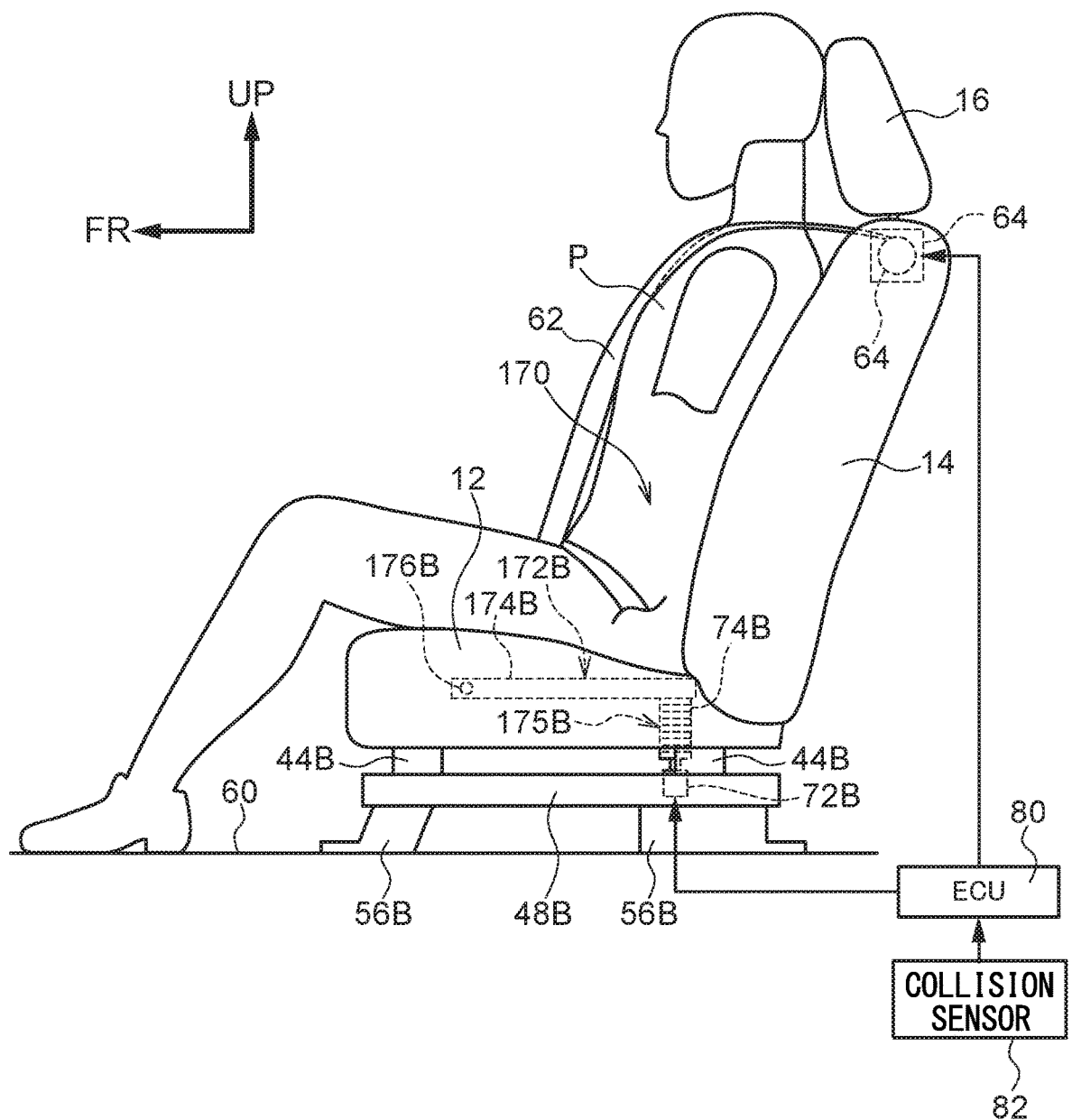
FIG. 11 is a side view showing a state in which a vehicle occupant is seated in a vehicle seat relating to a second embodiment.
Figure 12:
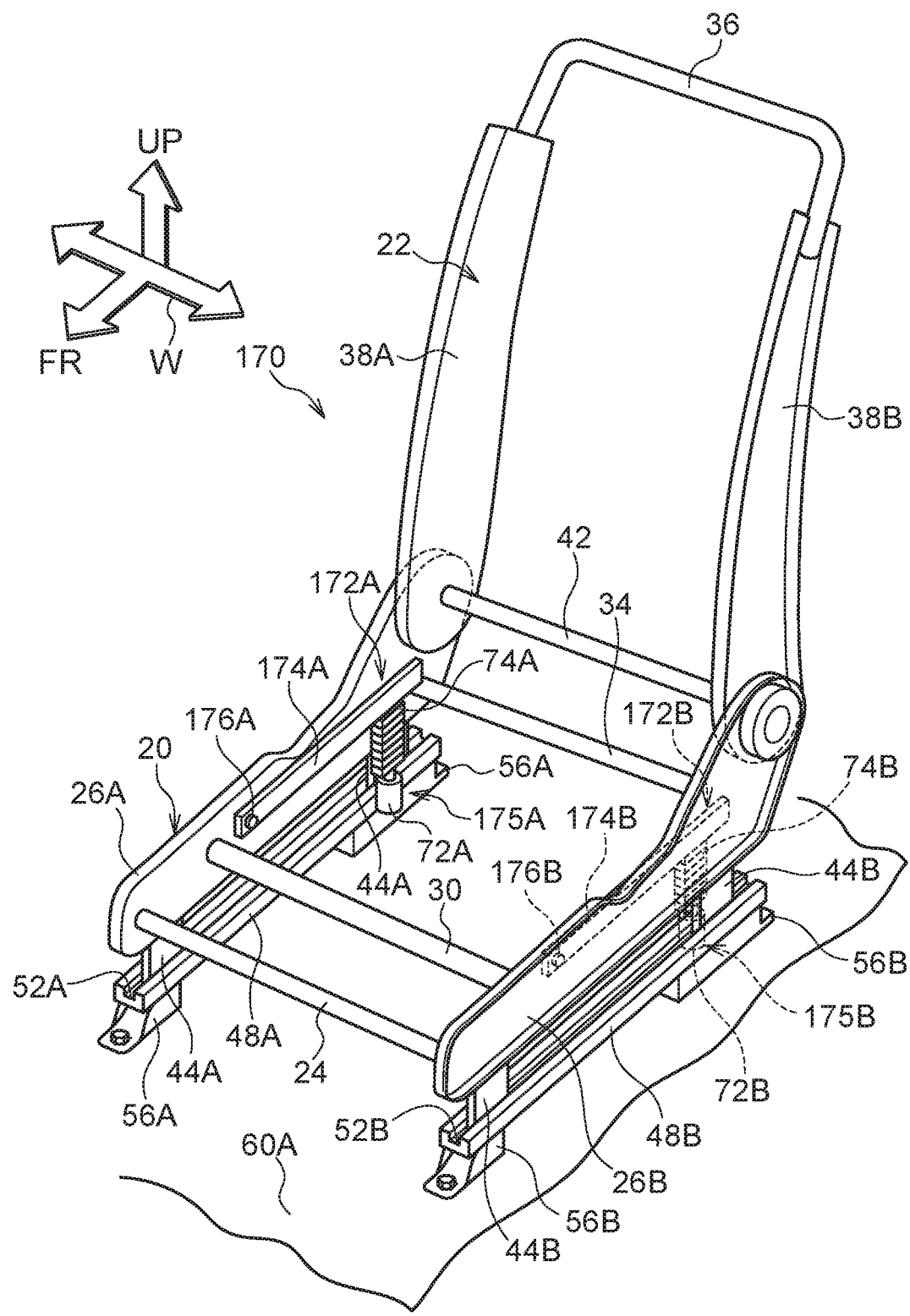
FIG. 12 is a perspective view showing a seat frame structure of the vehicle seat relating to the second embodiment.

As shown in FIG. 11 and FIG. 12, at the vehicle seat 170, forward tilting preventing units 172A, 172B are structured at the seat cushion frame 20. Because the structures of the forward tilting preventing units 172A, 172B are similar, only the forward tilting preventing unit 172A is described. Structural elements of the forward tilting preventing unit 172B that are similar to those of the forward tilting preventing unit 172A are denoted by the same reference numbers except with a B appended thereto, and description thereof is omitted.

Figure 13A:
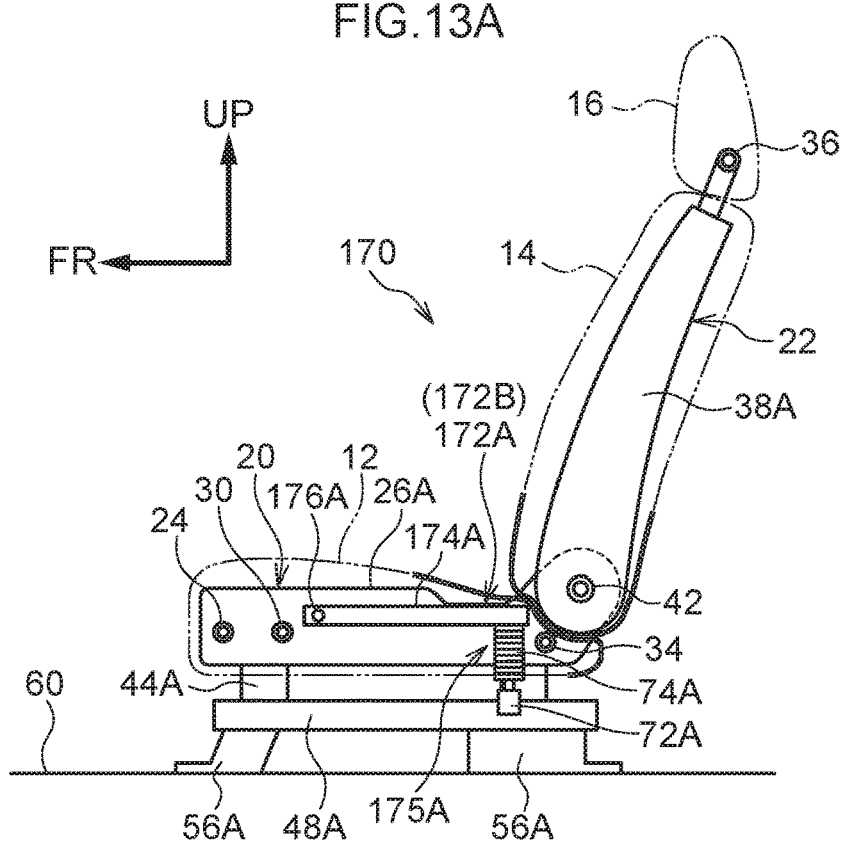
FIG. 13A is a side sectional view that corresponds to FIG. 4A and illustrates the usual state (a state not at the time of a seat front side collision) of the vehicle seat relating to the second embodiment.
Figure 13B:
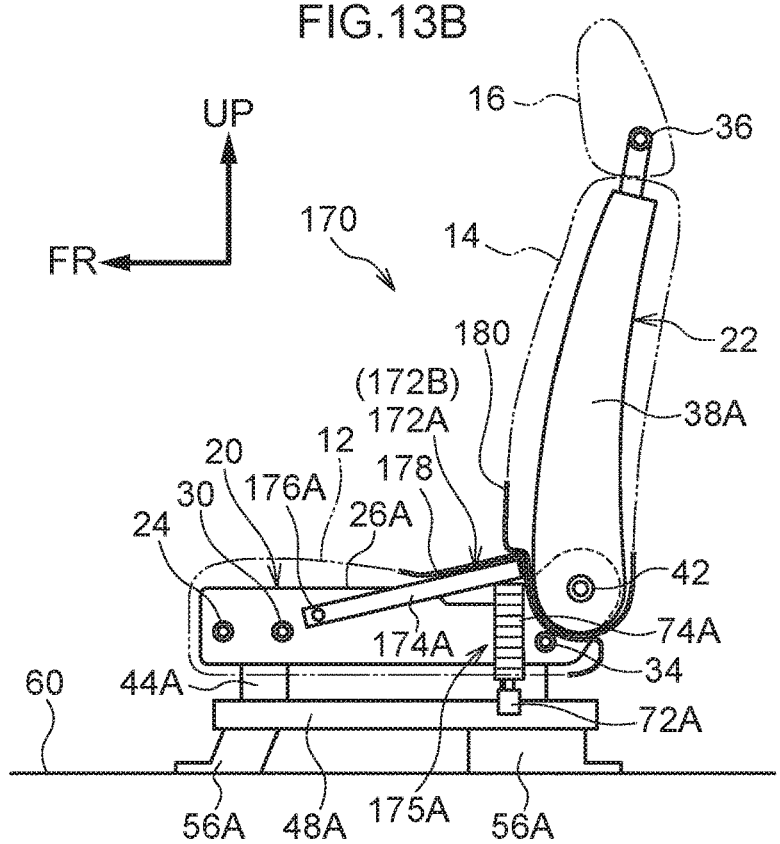
FIG. 13B is a side sectional view that corresponds to FIG. 4B and illustrates the state at the time of a seat front side collision of the vehicle seat relating to the second embodiment.

As shown in FIG. 12 and FIG. 13A, the forward tilting preventing unit 172A has a rod 174A that is provided so as to swing freely at the side frame 26A, and a driving unit 175A for sliding the rod 174A.

The rod 174A is disposed along the side frame 26A at a vehicle transverse direction inner side of the side frame 26A. The vehicle front side end portion of the rod 174A is supported so as to swing freely by a pin 176A that is formed to project-out from the side frame 26A toward the vehicle transverse direction inner side. The pin 176A (176B) corresponds to the "rotating shaft".

The driving unit 175A is mounted by an unillustrated mounting member to a vehicle transverse direction inner side and at a vehicle rear side of the side frame 26A. The driving unit 175A has a metal container 74A that is disposed along the vehicle vertical direction so as to be extendable toward a vehicle upper side, and the inflator 72A that is disposed at a lower end side of the metal container 74A. The upper end of the metal container 74A abuts the lower end of the rod 174A in a vicinity of a vehicle rear side end portion thereof. Due to the metal container 74A extending, the rod 174A swings around the pin 176A.

The metal container 74A corresponds to the "second movable member", and the inflator 72A corresponds to the "second driving member".

(Operation)

Operation and effects of the vehicle seat 170 that is structured in this way are described.

As shown in FIG. 11, when the ECU 80 detects a front collision to the automobile on the basis of an input signal from the collision sensor 82 that structures the vehicle seat 170, driving signals are outputted from the ECU 80 to the retractor 64 and the driving units 175A, 175B. Due thereto, the pretensioner of the retractor 64 is operated, the seatbelt 62 is taken-up, and the vehicle occupant P is restrained (see FIG. 11).

The inflator 72A of the driving unit 175A is driven, and operating gas is supplied from the inflator 72A to the metal container 74A. As a result, the metal container 74A expands, and extends toward the seat upper side (refer to FIG. 13B). Due thereto, the rod 174A, which is abutted from the lower side by the upper end of the metal container 74A, swings toward the vehicle upper side around the pin 176A, the seat cushion pad (not illustrated) is compressed, a skin 178 of the seat cushion 12 is thrust upward, and the seatback pad (not illustrated) and a skin 180 of the seatback 14 are recessed.

As a result, the rod 174A is positioned at a vehicle front side of the side frame 38A of the seatback frame 22, with the skins 178, 180 and the pads nipped between the rod 174A and the side frame 38A.

Here, when load toward the vehicle front side is inputted to the upper portion of the seatback 14 via the seatbelt 62 due to inertial movement of the vehicle occupant P due to a front collision, and a moment in the forward tilting direction is applied to the seatback 14 (the seatback frame 22), the side frame 38A that swings toward the vehicle front side abuts (is anchored on) a vehicle rear end side of the rod 174A, and forward tilting of the seatback 14 can thereby be prevented or suppressed.

Note that this "abutment" includes the side frames 38A, 38B abutting the rods 174A, 174B via the skins 178, 180 and the pads.

Further, in order to suppress forward tilting of the seatback 14, merely the driving units 175A, 175B and the rods 174A, 174B are added. Therefore, the rigidity of the seat (the seatback) is improved while an increase in the mass of the vehicle seat 10 is suppressed, and forward tilting of the seatback 14 can be prevented or suppressed.

(First through Fourth Variations)

Figure 14A:
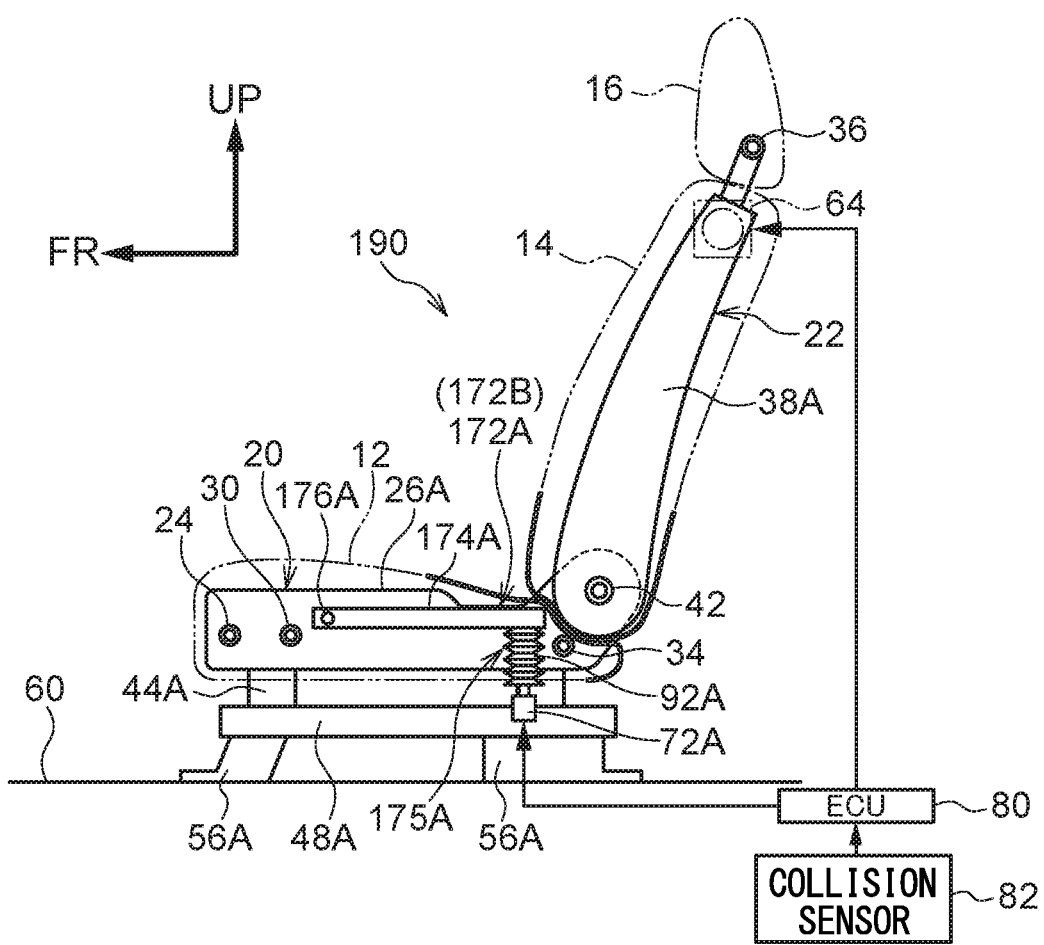
FIG. 14A is a side sectional view that corresponds to FIG. 4A and illustrates the usual state (a state not at the time of a seat front side collision) of a vehicle seat relating to a first variation of the second embodiment.
Figure 14B:
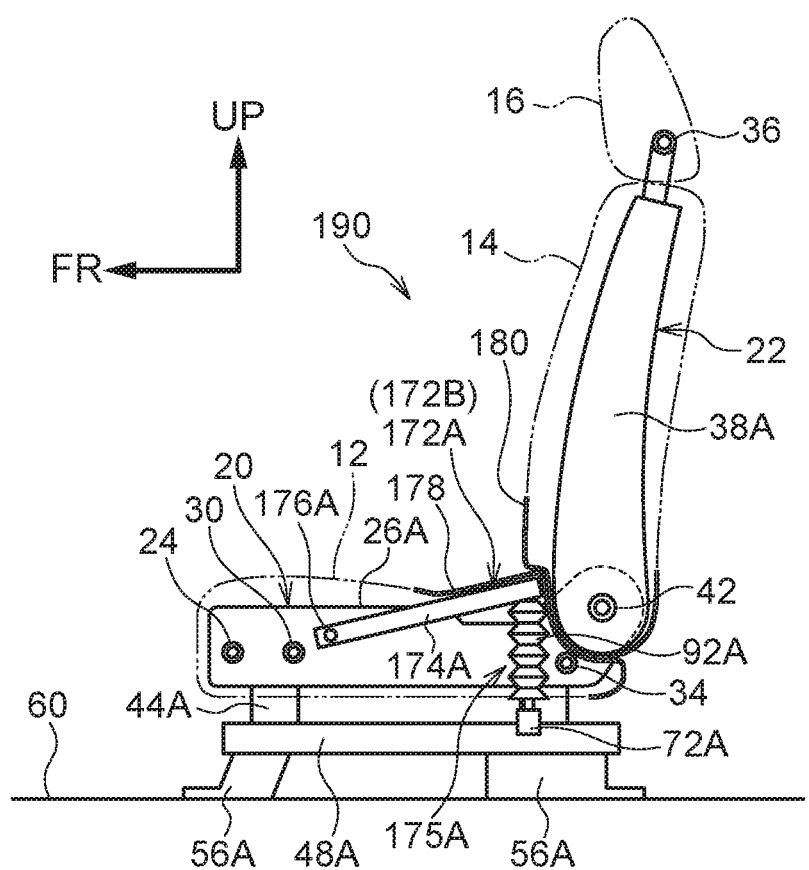
FIG. 14B is a side sectional view that corresponds to FIG. 4B and illustrates the state at the time of a seat front side collision of the vehicle seat relating to the first variation of the second embodiment.
Figure 15B:
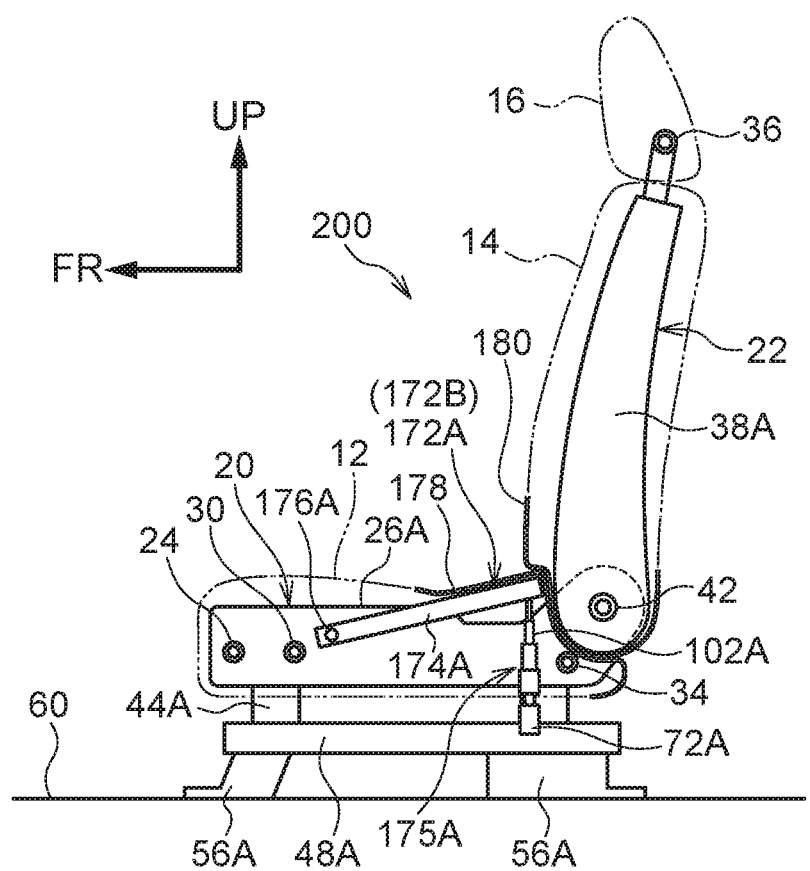
FIG. 15B is a side sectional view that corresponds to FIG. 4B and illustrates the state at the time of a seat front side collision of the vehicle seat relating to the second variation of the second embodiment.

Vehicle seats 190, 200 relating to first, second variations are shown in FIG. 14, FIG. 15, respectively. At the vehicle seats 190, 200, the metal containers 74A, 74B of the driving units 175A, 175B of the vehicle seat 170 are changed into the bellows-shaped pipes 92A, 92B and the multilayered pipes 102A, 102B of the first, second variations of the first embodiment. The bellows-shaped pipes 92A, 92B and the multilayered pipes 102A, 102B respectively correspond to the "second movable members".

A vehicle seat 210 relating to a third variation is shown in FIG. 16. At the vehicle seat 210, the driving units 175A, 175B instead use the multilayered pipes 122A, 122B that are urged by the coil springs 124A, 124B (not illustrated) of the third variation of the first embodiment. The multilayered pipes 122A, 122B correspond to the "second movable members".

Figure 17B:
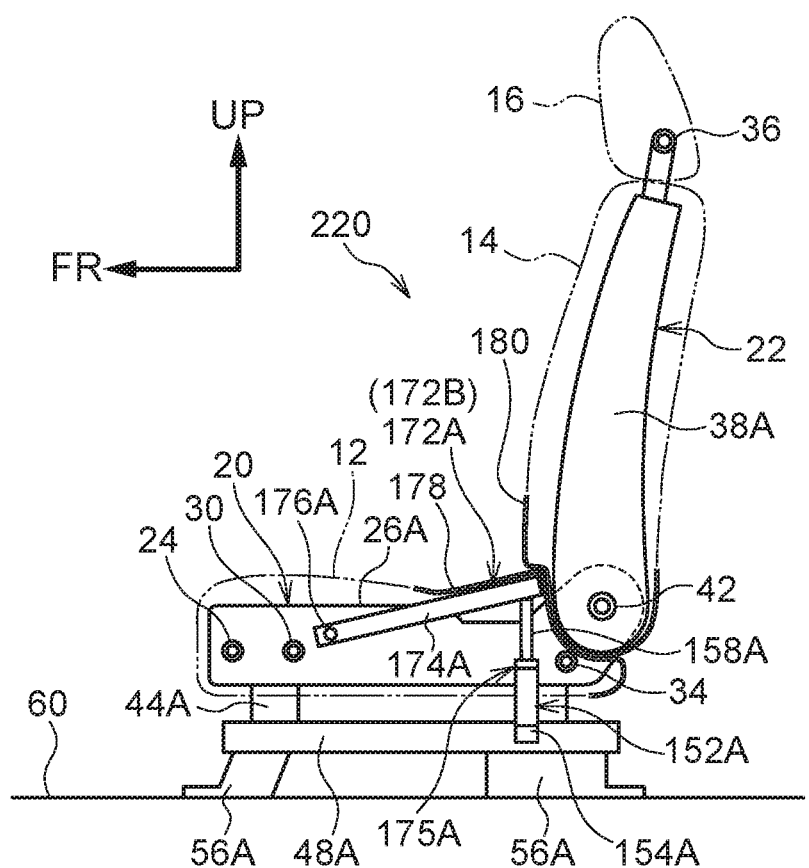
FIG. 17B is a side sectional view that corresponds to FIG. 4B and illustrates the state at the time of a seat front side collision of the vehicle seat relating to the fourth variation of the second embodiment.

Moreover, a vehicle seat 220 relating to a fourth variation is shown in FIG. 17. At the vehicle seat 220, the driving units 175A, 175B instead use the actuators 152A, 152B of the fourth variation of the first embodiment.

In cases of these structures as well, forward tilting of the seatback 14 can be prevented or suppressed while an increase in the mass of the vehicle seat 190, 200, 210, 220 is suppressed.

[Additional Description]

Note that, in the first and second embodiments, description is given of the vehicle seats 10, 170 that are positioned at the left side of the vehicle front seat (the front passenger's seat side). However, the vehicle seats 10, 170 can be applied similarly to the vehicle seats that are positioned at the right side of the vehicle front seat (the driver's seat side).

Further, the series of embodiments describe cases in which the vehicle seat is disposed so as to face toward the vehicle front side. However, for example, the embodiments can also be applied to a vehicle seat that is disposed so as to face toward a vehicle lateral side. In this case, due to driving signals being outputted from the ECU 80 at the time a side collision is sensed or predicted, the inflators or the like are driven, and the metal containers or the like extend. Due thereto, forward tilting of the seatback 14 can be suppressed. Further, for example, the embodiments can also be applied to a vehicle seat that is disposed so as to face toward the vehicle rear side. In this case, due to driving signals being outputted from the ECU 80 at the time a rear collision is sensed or predicted, the inflators or the like are driven, and the metal containers or the like extend. Due thereto, forward tilting of the seatback 14 can be suppressed. In short, it suffices for there to be a structure in which the ECU 80 senses that there is a collision at the seat front side of the vehicle seat, and outputs a driving signal to the driving member such as the inflator or the like.

Further, in the series of embodiments, on the basis of the sensing of a collision by the collision sensor 82, the pretensioner is driven, and the movable member is deformed or displaced. However, there may be a structure in which the pretensioner is driven and the movable member is deformed or displaced in a case in which it is detected that a collision is inevitable on the basis of a pre-crash sensor.

Moreover, although the series of embodiments describe vehicle seats in which the seatbelt device 61 is installed as a restraining device, embodiments are not limited to this. Similar operation and effects are achieved also in cases in which, for example, an airbag for a front collision or an airbag for a side collision or the like is installed in the vehicle seat (the seatback 14) as a restraining device.

Further, the series of embodiments are structured such that the movable member is deformed or displaced at the vehicle front side of the reclining rod 42. However, there may be a structure in which the movable member is deformed or displaced at the vehicle rear side of the reclining rod 42.

Moreover, the first embodiment is structured such that the lower end portions of the forward tilting preventing units 70A, 70B abut the rear cross member 34 or the pin 162A of the vehicle seat. However, there may be a structure in which the lower end portions of the forward tilting preventing units 70A, 70B abut other cross members or convex portions that protrude toward the vehicle transverse direction inner side from the side frames 26A, 26B.

Further, in the series of embodiments, the pairs of forward tilting preventing units 70A, 70B, 172A, 172B are provided along the pairs of side frames 38A, 38B, 26A, 26B. However, rather than pairs, there may be a single forward tilting preventing unit disposed along one of the pairs of side frames 38A, 38B, 26A, 26B. In such a case as well, forward tilting of the seatback 14 can be prevented or suppressed.

What is claimed is:

1. A vehicle seat installed with a vehicle occupant restraining device, the vehicle seat comprising:
   a seat cushion frame forming a frame of a seat cushion, and including a seat cushion side frame that extends in a seat front-rear direction at a seat transverse direction end portion;
   a seatback frame supported swingably about a reclining rod, the reclining rod extending in a seat transverse direction at a seat rear end side of the seat cushion frame, the seatback frame extending toward a seat upper side from a seat rear end side of the seat cushion frame, and the seatback frame including a seatback side frame that extends in a seat vertical direction at a seat transverse direction end portion;
   an engaging portion disposed at a seat rear end side of the seat cushion side frame and at a seat lower side relative to the reclining rod, and protruding toward a seat transverse direction inner side;
   a first movable member disposed along the seatback side frame, a lower end portion of the first movable member being positioned at a seat front side of the engaging portion due to the first movable member extending toward a seat lower side; and
   a first driving member configured to extend the first movable member in a case in which a vehicle collision at a seat front side occurs or in a case in which a vehicle collision at the seat front side is predicted.

2. The vehicle seat of claim 1, wherein the seat cushion side frame is provided at both seat transverse direction end portions of the seat cushion frame, and the engaging portion is formed at both of the seat transverse direction end portions of the seat cushion frame so as to protrude toward seat transverse direction inner sides of the seat cushion side frames, respectively, and the first movable member is provided at both seat transverse direction end portions of the seatback frame, and lower end portions of the first movable members are positioned at seat front sides of the respective engaging portions due to extension of the first movable members.

3. The vehicle seat of claim 2, wherein each of the engaging portions is a cross member that spans, in the seat transverse direction, between seat rear sides of the seat cushion side frames.

4. The vehicle seat of claim 2, wherein the engaging portions are convex portions that are formed so as to protrude toward seat transverse direction inner sides at seat rear sides of the seat cushion side frames.

5. The vehicle seat of claim 1, wherein the first driving member is an inflator that is operated in a case in which a vehicle collision at a seat front side occurs or in a case in which a vehicle collision at the seat front side is predicted, and the first movable member is a metal container that is extendable on receipt of an operating gas supplied from the inflator.

6. The vehicle seat of claim 1, wherein the first driving member is an inflator that is operated in a case in which a vehicle collision at a seat front side occurs or in a case in which a vehicle collision at the seat front side is predicted, and the first movable member is a bellows-shaped pipe or a multilayered pipe that is extendable on receipt of an operating gas supplied from the inflator.

7. The vehicle seat of claim 1, wherein the first movable member is a multilayered pipe having a seat lower side end portion that is anchored by a first anchor member, the multilayered pipe is extendable toward a seat lower side, the first driving member comprises a first urging member and a first releasing member, the first urging member urges the multilayered pipe toward the seat lower side, and the first releasing member releases an anchoring state of the first anchor member in a case in which a vehicle collision at a seat front side occurs or in a case in which a vehicle collision at the seat front side is predicted.

8. A vehicle seat installed with a vehicle occupant restraining device, the vehicle seat comprising:
 a seat cushion frame forming a frame of a seat cushion, and including a seat cushion side frame that extends in a seat front-rear direction at a seat transverse direction end portion;
 a seatback frame supported swingably about a reclining rod, the reclining rod extending in a seat transverse direction at a seat rear end side of the seat cushion frame, the seatback frame extending toward a seat upper side from a seat rear end side of the seat cushion frame, and the seatback frame including a seatback side frame that extends in a seat vertical direction at a seat transverse direction end portion;
 a rod disposed along the seat cushion side frame, and positioned at a seat front side of the seatback side frame by swinging toward a seat upper side around a rotating shaft that extends in a seat transverse direction at a seat front side portion of the rod; and
 a driving unit configured to swing the rod toward the seat upper side in a case in which a vehicle collision at a seat front side occurs or in a case in which a vehicle collision at the seat front side is predicted.

9. The vehicle seat of claim 8, wherein the rod is provided at both seat transverse direction end portions of the seat cushion frame, and the driving unit is provided at both of the seat transverse direction end portions of the seat cushion frame, and the respective driving units swing the respective rods toward the seat upper side in a case in which a vehicle collision at a seat front side occurs or in a case in which a vehicle collision at the seat front side is predicted.

10. The vehicle seat of claim 8, wherein the driving unit has a second movable member and a second driving member, the second movable member supports a seat rear side end portion of the rod from a seat lower side and is extendable toward the seat upper side, and the second driving member extends the second movable member in a case in which a vehicle collision at a seat front side occurs or in a case in which a vehicle collision at the seat front side is predicted.

11. The vehicle seat of claim 10, wherein the second driving member is an inflator that is operated in a case in which a vehicle collision at a seat front side occurs or in a case in which a vehicle collision at the seat front side is predicted, and the second movable member is a metal container that is extendable toward the seat upper side on receipt of an operating gas supplied from the inflator.

12. The vehicle seat of claim 10, wherein the second driving member is an inflator that is operated in a case in which a vehicle collision at a seat front side occurs or in a case in which a vehicle collision at the seat front side is predicted, and the second movable member is a bellows-shaped pipe or a multilayered pipe that is extendable toward the seat upper side on receipt of an operating gas supplied from the inflator.

13. The vehicle seat of claim 10, wherein the second movable member is a multilayered pipe having a seat upper side end portion that is anchored by a second anchor member, the multilayered pipe is extendable toward a seat upper side, the second driving member comprises a second urging member and a second releasing member, the second urging member urges the multilayered pipe toward the seat upper side, and the second releasing member releases an anchoring state of the second anchor member in a case in which a vehicle collision at a seat front side occurs or in a case in which a vehicle collision at the seat front side is predicted.

* * * * *